United States Patent
Brunner

(10) Patent No.: US 11,734,659 B2
(45) Date of Patent: *Aug. 22, 2023

(54) MESSAGE-BASED BILL PAYMENT

(71) Applicant: Pay2Day Solutions, Inc., El Segundo, CA (US)

(72) Inventor: Christopher J. Brunner, El Segundo, CA (US)

(73) Assignee: Pay2Day Solutions, Inc., El Segundo, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 17/497,032

(22) Filed: Oct. 8, 2021

(65) Prior Publication Data
US 2022/0101283 A1 Mar. 31, 2022

Related U.S. Application Data

(63) Continuation of application No. 15/142,667, filed on Apr. 29, 2016, now Pat. No. 11,144,895.

(60) Provisional application No. 62/155,631, filed on May 1, 2015.

(51) Int. Cl.
G06Q 20/10 (2012.01)
H04W 4/14 (2009.01)
G06F 21/31 (2013.01)

(52) U.S. Cl.
CPC .......... *G06Q 20/102* (2013.01); *H04W 4/14* (2013.01); *G06F 21/31* (2013.01)

(58) Field of Classification Search
CPC ........ G06Q 20/102; H04W 4/14; G06F 21/31
See application file for complete search history.

(56) References Cited

U.S. PATENT DOCUMENTS

| | | |
|---|---|---|
| 5,761,308 A | 6/1998 | Torii et al. |
| 6,278,996 B1 | 8/2001 | Richardson et al. |
| 7,537,152 B2 | 5/2009 | Chakiris et al. |
| 7,664,670 B1 | 2/2010 | Weiss |
| 7,774,333 B2 | 8/2010 | Colledge et al. |
| 8,073,773 B2 | 12/2011 | Kozee et al. |
| 8,515,736 B1 | 8/2013 | Duta |

(Continued)

FOREIGN PATENT DOCUMENTS

| | | | |
|---|---|---|---|
| WO | WO-2015023367 | 2/2015 | |
| WO | WO-2015023367 A1 * | 2/2015 | ............. G06F 16/29 |
| WO | WO-2016179012 | 11/2016 | |

OTHER PUBLICATIONS

Chen. Jen N.: Adaptive Word Sense Disambiguation using Lexical Knowledge in a Machine-readable Dictionary, Aug. 2000, Computational Linguisitics and Chinese Language Processing, Computational Lingustic Society of Republic of China ( R.O.C), vol. 5, No. 2, pp. 1-42 (Year: 2000).*

(Continued)

*Primary Examiner* — Bijendra K Shrestha
(74) *Attorney, Agent, or Firm* — Strategic Patents, P.C.

(57) ABSTRACT

Provided herein are methods and systems for a bill payment platform that enables consumers to make bill payments using simplified methods of communication, such as by using text messages or short messaging service (SMS) messages and the like, through message interfaces provided by the bill payment platform, which may include components for context-based notification, intelligent message interpretation, and regulatory compliance.

20 Claims, 25 Drawing Sheets

(56) References Cited

U.S. PATENT DOCUMENTS

| | | | |
|---|---|---|---|
| 8,543,504 | B1 | 9/2013 | Harris et al. |
| 8,776,132 | B2 | 7/2014 | Wenger et al. |
| 8,868,769 | B2 | 10/2014 | Prywes |
| 8,893,250 | B2 | 11/2014 | Rozenberg et al. |
| 8,943,437 | B2 | 1/2015 | Meurs |
| 9,542,710 | B1 * | 1/2017 | Izrailevsky ............ G06Q 40/12 |
| 9,715,689 | B1 | 7/2017 | Ellis et al. |
| 2007/0185831 | A1 | 8/2007 | Churcher |
| 2008/0103967 | A1 | 5/2008 | Ackert et al. |
| 2009/0170485 | A1 | 7/2009 | Yap |
| 2009/0319420 | A1 | 12/2009 | Sanchez et al. |
| 2012/0078732 | A1 | 3/2012 | Heller et al. |
| 2012/0136780 | A1 | 5/2012 | El-awady et al. |
| 2012/0173421 | A1 | 7/2012 | Fujii et al. |
| 2012/0278142 | A1 | 11/2012 | Li |
| 2013/0053133 | A1 | 2/2013 | Schueller et al. |
| 2013/0179330 | A1 | 7/2013 | Quillian et al. |
| 2013/0218697 | A1 | 8/2013 | Kingston et al. |
| 2013/0346302 | A1 | 12/2013 | Purves et al. |
| 2014/0207687 | A1 * | 7/2014 | Rammal ............ G06Q 20/3255 705/72 |
| 2015/0163186 | A1 | 6/2015 | Tian |

OTHER PUBLICATIONS

Berger et al.: Web Service on Mobile Devices—Implementation and Experience, 2003, Proceedings of the Fifth IEEE Workshop on Mobile Computing Systems & Applications (WMCSA2003), pp. 1-5. (Year: 2003).*

Mayrhofer et al.: Spontaneous Mobile device Authentication based on Sensor Data, 2008, Information Security Technical Report 13,pp. 136-150 (Year: 2008).*

ADRIFT 5 Manual Wiki, "Verbs and Commands", Aug. 26, 2013, 9 pages.

Chen, Jen N., "Adaptive Word Sense Disambiguation using Lexical Knowledge in a Machine-readable Dictionary", Computational Linguistics and Chinese Language Processing, Computational Linguistic Society of Republic of China (R.O.C), vol. 5, No. 2 Aug. 2000, 42 pages.

ADRIFT 5 Manual Wiki, "The Command Parser", Nov. 20, 2012, 5 pages.

"U.S. Appl. No. 15/142,667 Non-Final Office Action dated May 23, 2019", 29 pages.

"U.S. Appl. No. 15/142,667 Non-Final Office Action dated Oct. 2, 2018", 38 pages.

"U.S. Appl. No. 15/142,667 Non-Final Office Action dated Dec. 24, 2020", 17 pages.

"U.S. Appl. No. 15/142,667 Notice of Allowance dated Jul. 21, 2021", 16 pages.

"U.S. Appl. No. 15/142,667 Final Office Action dated Jun. 8, 2020", 27 pages.

O'Leary, Daniel E., "Crowdsourcing Tags in Accounting and Finance", Analysis and Emerging Issues, 2013 (and 2015) American Accounting Association Annual Meeting, Anaheim, California, pp. 93-115 (Year: 2013), 23 pages.

WIPO, "PCT Application No. PCT/US16/30157 International Preliminary Report on Patentability dated Nov. 16, 2017", 11 pages.

ISA, "PCT Application No. PCT/US16/30157 International Search Report and Written Opinion dated Aug. 12, 2016", 13 pages.

* cited by examiner

FIG. 3A

PayNSeconds Demo

Brunner, Christopher — Logout

Back to Dashboard

Pay Bill

Total Amount Due: $120.00
Card Number
[Card Number]
Name on Card
[Card Holder's Name]
Expiration Date
[1] [2015]
Zip Code
[Zip Code]
Email Address
[Email Address]
☐ Please accept our Terms and Conditions
Amount To Pay
$120.00
Payment Summary
Amount To Pay $120.00
PayNSeconds Processing Service $3.51
Total Payment Amount $123.51

(Submit)

DigitalHearts USA Inc

- Dashboard
- Upload
- Consumers
- Payments
- API Verify
- My Settings
- Reports

394

Bill Upload Complete

Your upload is being processed. You can use this page to track its progress and be notified of any errors that happen, this page can be refreshed to update the information bellow. You can also create a link to this page and come back later to check on the status.

✓ Success! — 396

| | |
|---|---|
| Total Rows | 0 |
| Validation Errors | 0 |
| Successfully Uploaded | 1 |
| Job ID | 2e01b466-0f95-432f-a2f1-ca0ff85f2a11 |

398

[Download Error Report] — 399

FIG. 3F

Digital Hearts USA Inc

D♡
1
★★★★★

- Dashboard
- Upload
- Consumers
- Payments
- API Verify
- My Settings
- Reports ▶

394

Upload Bill File

☐ My file has no header labels on the first line.

[📁 Choose a file...] [⬆ Begin Upload]

3002

- The file you are uploading is of type CSV (file name ends with .csv)
- The file contains a header row (top row in the file). The following values (column headers) must be included in your file:
  - consumer_id
  - payment_id
  - payment_description
  - payment_amount
  - payment_due_date
- If the file contains additional columns, that data will be uploaded and stored
- The columns in the uploaded file may be placed in any order

3004

Logout

Digital Hearts USA Inc

☆☆☆☆☆
1
D♡

Logout

- ⚙ Dashboard
- ⬆ Upload
- 👥 Consumers
- 🧾 Payments ← 394
- ⚙ API Verify
- 🔧 My Settings
- 🥧 Reports ▾

Payments 30 days

| Version | Late Amount In Cents | Amount Due In Cents | Description | Due On | Created On | Currency | Biller Bill Id | Consumer Biller Account UUID | Late |
|---|---|---|---|---|---|---|---|---|---|
| 5 | 0 | 0 | Water Service | Mar 22, 2016 | Mar 5 2015 | Usd | chris 1001 | 2e5c5ef-9fde-49fe-b9b8-2eba8b94b32a | false |
| 5 | 0 | 4600 | Water Service | Mar 22, 2016 | Mar 5 2015 | Usd | chris 1000 | 9607ebe-e36c-4571-850f-cd0d9baebe2a | false |

Digital Hearts USA Inc

D♡
1
★★★★★

- Dashboard
- Upload
- Consumers
- Payments
- API Verify
- My Settings
- Reports ▾

Edit 'Digital Hearts USA Inc'

| Logo Upload | $ Feesend Adjustment Config | Templates | Payment Notifications | Payments | Login As This Biller |

Name
[Digital Hearts USA Inc]

Mobile Friendly Name
[DH]

Login page URL
http://sandbox.iauthorize.it/biller/security/login/06ff48ee6-973d-4d9e-82a9-cca473c3815d API Access ID
06ff48ee6-973d-4d9e-82a9-cca473c3815d API Secret Key ☑ Create Consumer During Email
☑ Send Confirmation Email From Email Address
[DHfrom@pay2daysolutions.com]

Logout

Edit 'Digital Hearts USA Inc'

| Logo Upload | $ Fees and Adjustment Config | Templates | Payment Notifications | Payments | Login As This Biller |

Name
Digital Hearts USA Inc

Mobile Friendly Name
DH

Login page URL
http://sandbox.iauthorize.it/biller/security/login/06ffd8e6-973d-4d9e-82a9-cca473d38f5d

API Access ID
06ffd8e6-973d-4d9e-82a9-cca473d38f5d

API Secret Key

☑ Create Consumer During Email
☑ Send Confirmation Email

From Email Address
DHfrom@pay2daysolutions.com

Help Email
DHfrom@pay2daysolutions.com

Login Welcome Message
DigitalHearts USA Inc. 1 welcome message message DigitalHearts Inc. 1 welcome message message DigitalHearts Inc. 1

Page Footer
DigitalHearts USA Inc. 1 footer footer footer footer footer footer footer footer ???

MESSAGE-BASED BILL PAYMENT

RELATED APPLICATIONS

This application is a continuation of U.S. patent application Ser. No. 15/142,667 filed on Apr. 29, 2016 (now U.S. Pat. No. 11,144,895), which claims the benefit of U.S. Provisional App. No. 62/155,631 filed on May 1, 2015, the entire contents of which is hereby incorporated by reference.

TECHNICAL FIELD

This disclosure relates to the field of bill payments, and more particularly to payments using messaging systems, such as SMS.

BACKGROUND

Technologies have been developed for facilitating bill payment, including ones that allow users to pay bills using mobile devices. These include mobile wallet systems, electronic commerce functions of mobile browsers, and systems that allow users to send messages approving payments. Such systems may allow a customer to pay a bill to a merchant or service provider, such as by charging an account or credit card of the consumer. However, such systems are typically difficult to develop and administer, in particular for parties who do not have large IT departments, or who do not have extensive experience in handling electronic payments. A need exists for systems by which an enterprise may have a party, referred to herein in many cases as a host, handling billing for large numbers of bills in a manner that is highly simplified for billers and consumers.

Communications systems exist for messaging, such as for text messages, SMS, chat, and the like. However, such systems are typically quite constrained, such as requiring users to reply with very specific codes. A need exists for more sophisticated systems that can handle more flexible communications over systems like SMS, while maintaining security and reliability in contexts where large numbers of bills are being handled.

Merchants often find the need to collect overdue debts and may turn to third party debt collectors to facilitate collection. However, questionable debt collection practices have led to intense regulation of debt collection activity, including the need for the documentation that certain specific types of communications (such as warnings and disclaimers, as well as full disclosure of financial terms) have been made, understood and acknowledged by consumers before the debt collector may accept payment. Such obligations have made it very difficult for debt collectors to accept payments using conventional channels, such as by phone calls to debtors. A need exists for methods and systems that enable simplified debt collection while maintaining full compliance with regulatory requirements.

SUMMARY

The methods and systems disclosed in the present disclosure relate to a bill payment platform, which in some cases may comprise a debt collection platform for an overdue bill or other debt. References to a "bill" throughout this disclosure should be understood to encompass, except where context indicates otherwise, any form of outstanding payable between a consumer and a merchant. The bill payment platform may enable consumers to make bill payments using simplified methods of communication, such as by using text messages or short messaging service (SMS) messages and the like, through message interfaces provided by a bill payment platform.

The bill payment platform may also provide a facility for the billing service or biller to allow collection of debts in compliance with regulations that relate to various regulatory requirements for debt collection, such as by maintaining a clear, auditable record of the delivery and acknowledgement of required communications in connection with the payment of a debt. The terms "biller," "merchant," "vendor," and the like should be understood to encompass, except where context indicates otherwise, any party that provides a bill to a party, such as a consumer, for goods, services, or the like.

The devices, systems, and methods discussed herein may enable billers to allow their customers to undertake simplified bill payments, such as through a simple message interface (e.g., SMS), as well as to ensure billers the ability to facilitate collection of debts, while also complying with regulations that relate to the emerging regulatory requirements for debt collection.

The methods and systems described herein may include methods and systems for a bill payment computing platform enabled by a host server module. Such methods and system may include a bill handling component for handling a plurality of bills of a plurality of merchants; a short messaging communications component for presenting at least one bill of a merchant to a consumer via a short message format and for taking a message from a consumer relating to the bill; a secure transaction component for automatically authenticating a consumer prior to initiating a bill payment and initiating a payment from the consumer to the merchant upon the authentication; and a message interpretation component for automatically disambiguating a message received from the consumer at the short message communications component and initiating a bill-related processing action based on the interpretation.

The methods and systems described herein may further include a regulatory compliance component that is configured to automatically provide a plurality of disclosures to the consumer in connection with a bill collection process and is configured to automatically prompt a plurality of authorizations from the consumer prior to initiating the taking of a bill payment from the consumer, wherein the plurality of disclosures and the plurality of authorizations are configured in the platform to satisfy regulatory guidelines.

In embodiments the regulatory guidelines comprise the Regulation E guidelines for Electronic Funds Transfer (EFT).

The methods and systems described herein may further include a white label consumer-facing portal, wherein the white label consumer facing portal is configured to interact with the host server module for a billing-related transaction of the consumer.

The methods and systems described herein may further include embodiments wherein the billing-related transaction of the consumer comprises payment of a pending bill of the consumer.

The methods and systems described herein may further include embodiments wherein the biller portal is configured to interact with the host server for a billing related transaction of the consumer.

In embodiments the billing related transaction of the biller comprises loading of bills on the bill payment platform by the plurality of merchants.

In embodiments loading of bills comprises at least one of uploading the bills to the platform from a file system serially under automated computer control, uploading the bills automatically to the platform from a file system in a batch, manually inserting at least a portion of a billing record to the platform, and loading the bills via an application programming interface of the platform.

The methods and systems described herein may further include embodiments including a tokenization engine and a processing component. In embodiments the tokenization engine is configured to generate a token and send an output to the processing component so that the processing component executes preprogrammed instructions to perform a plurality of payment processing operations based on available information.

The methods and systems described herein may further include embodiments wherein the mapping component is configured to map consumer information for a plurality of consumers with information related to a plurality of bills associated with the plurality of consumers to identify respective bills of the consumers.

The methods and systems described herein may further include embodiments wherein the storage component is configured to store data associated with a plurality of components of the bill payment platform.

In embodiments the secure transaction component is configured to enable the consumer to pre-register with the bill payment platform and opt-in for paying the bill through the bill payment platform.

In embodiments the consumer is facilitated to use the Short Messaging Service (SMS).

In embodiments the consumer is facilitated to use at least one of Interactive Voice Response (IVR)-based registration and API-based registration to opt-in for paying the bill using the bill payment platform.

The methods and systems described herein may include methods and systems for making bill a payment using a bill payment platform. Such methods and systems may include directing a consumer to a consumer portal of the bill payment platform; presenting a bill to the consumer via a short message format through the bill payment platform and taking a message from the consumer relating to the bill; authenticating the consumer prior to taking the bill payment from the consumer; disambiguating a message received from the consumer; and initiating a bill-related processing action based on an interpretation of the message.

The methods and systems described herein may further include facilitating logging in to the bill payment platform by the consumer; facilitating the consumer review of bill information; enabling the consumer to opt in to the bill payment platform to make use of a bill pay service of the bill payment platform; receiving an SMS for authenticating the consumer; responding with a Personal Identification Number (PIN) for completing authentication of the consumer; and mapping consumer information with the bill information associated with one or more bills associated with the consumer.

The methods and systems described herein may further include accepting a phone call to an IVR system associated with the bill payment platform; inviting the consumer to opt-in to a bill pay service of the bill payment platform; receiving an SMS for authenticating the consumer; responding with a Personal Identification Number (PIN) for completing authentication of the consumer; and mapping consumer information with the bill information associated with one or more bills associated with the consumer.

The methods and systems described herein may further include receiving the message from the consumer; identifying keywords included in the message, wherein the keywords correspond to a set of pre-defined keywords provided to the consumer; matching the keywords with a set of commands stored in a message interpretation table; and performing an action associated with an associated command from the set of commands that matches with the keywords.

The methods and systems described herein may further include disambiguating the message based on a set of constraints selected from a group comprising of a status of a user, a historical SMS pattern of the user, and a message context.

In embodiments the set of pre-defined keywords are provided to the consumer at the time of registration of the consumer with the bill payment platform.

In embodiments the set of pre-defined keywords are provided to the consumer at the time of opting-in of the consumer for the bill pay service of the bill payment platform.

The methods and systems described herein may further include providing, via SMS, a plurality of disclosures to the consumer and receiving a plurality of authorizations from the consumer, prior to initiating the taking of a bill payment from the consumer, wherein the plurality of disclosures and the plurality of authorizations are in compliance with the Regulation E guidelines for Electronic Funds Transfer (EFT).

The methods and systems described herein may further include storing the SMS thread containing the disclosures in a data storage facility in order to make them available for a regulatory compliance process.

In embodiments the disclosures comprise the initial disclosures required for Regulation E compliance and disclosures required for compliance with at least one debt collection law.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the systems and methods disclosed herein.

FIGS. 3A-3D illustrate a user interface of a consumer facing portal and a user interface of a biller (e.g., merchant) portal for enabling the biller to arrange for its customers to undertake bill payments in accordance with an embodiment of the systems and methods disclosed herein.

FIGS. 3F-3L provide screenshots of an embodiment of a biller interface for a white label consumer facing portal and biller (merchant) portal in accordance with an embodiment of the systems and methods disclosed herein.

Figure 1:
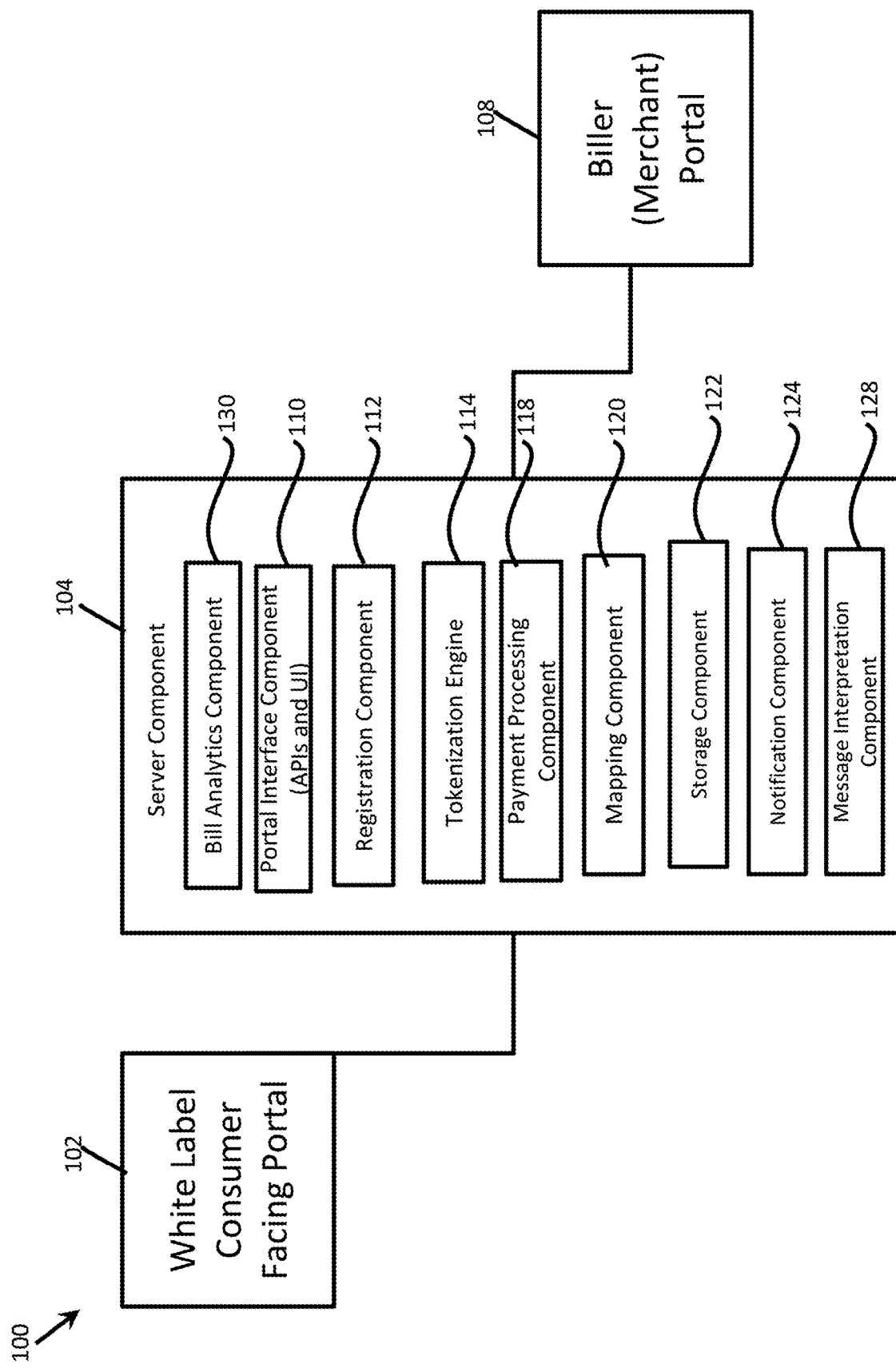
FIG. 1 illustrates an architecture for a bill payment platform in accordance with an embodiment of the systems and methods disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method steps and/or system components. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art having the benefit of the description herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

FIG. 1 illustrates components of an embodiment of a bill payment platform 100 in accordance with an embodiment of the systems and methods disclosed herein. The bill payment platform 100 may include a white label consumer facing portal 102, a server component 104, which may be hosted by a host of the methods and systems disclosed herein or by or on behalf of a biller, and a biller portal 108 (referred to interchangeably throughout this disclosure as a merchant portal 108). The white label consumer facing portal 102 and the biller portal 108 may be configured to interact with the server component 104 for information exchange and to facilitate financial transactions, such as bill payments, bill views, bill loading/notification, and payments processing and authorization and the like. Loading of bills may include at least one of uploading the bills to the platform from a file system serially under automated computer control, uploading the bills automatically to the platform from a file system in a batch, manually inserting at least a portion of a billing record to the platform, and loading the bills via an application programming interface of the platform. The white label consumer facing portal 102 may be provided with various branding elements, logos, and other "skins" that make the white label consumer facing portal 102 appear to be part of the native environment of a particular biller with whom the consumer does business, such as a merchant.

In an example, the white label consumer facing portal 102 and the biller portal 108 may be part of a website, such as the biller's website, which may be accessed by a user on a communication device. The website(s), or portions thereof, may be hosted on a server, such as including the server component 104, which may be part of the enterprise infrastructure of the biller (e.g., on premises infrastructure, or public or private cloud infrastructure) or which may be hosted by the host on its infrastructure.

In embodiments, a consumer may access the biller's website using his smart phone. When the user opens the biller's website using his smart phone, the white label consumer facing portal 102 may be presented to the user. The consumer may then be prompted to provide or confirm information or instructions related to a function, such as relating to bill payment, on the biller's website. Such information or instructions may include information sufficient to set up bill payments using the smart phone, such as payments made by SMS or text message.

The server component 104 may include a portal interface component 110, such as relating to or enabling the website discussed above, wherein the portal interface component 110 may facilitate interactions and interfacing of the white label consumer facing portal 102 and the biller portal 108 with the server component 104 over a secured network. The portal interface component 110 may enable the user to view the bill payment platform 100 embedded on the white label consumer facing portal 102, such as to pay bills corresponding to a biller or to set up payment of bills by other mechanisms, such as through the SMS/text functions of the user's smart phone. The consumer may thus provide information related to the bills to be paid and information about the consumer by accessing the white label consumer facing portal 102 of the bill payment platform 100. The information provided by the consumer via the white label consumer facing portal 102 may then be taken by the server component 104 for further processing. The server component 104 may then process the user information as discussed later. The user information may include but is not limited to a consumer identifier (ID), a phone number, one or more email addresses, a zip code, a consumer time zone, a biller identifier, a bill description, a bill amount, a PIN, a due date and the like for one or more bills or billers of the consumer. In embodiments, a default PIN may be provided to the user, such as the last four digits of the user's phone number, the last four digits of the user's social security number, or the like, and the user may be prompted to change this default number, such as by interacting with a web-based user-interface to the platform. The PIN may, in embodiments, comprise any combination of numbers, letters, or other symbols chosen by the user or by the host to provide validation of the authenticity of the user.

The server component 104 further includes a registration component 112. The registration component 112 may be configured to allow a consumer to pre-register with the platform 100 and opt in to paying bills by the platform 100, including through various modes, such as SMS/text and the like. The registration component 112 may include a set of APIs for enabling consumer registration and interaction with the platform 100 through the portal interface component 110. The registration of the consumer with the platform 100 may allow the consumer to interact with the platform 100 through the white label consumer portal 102, such as using login or registration credentials, which upon successful entry may allow the consumer to view bills, pay bills through various modes, set up future bill presentment and payment modes, and perform various other data exchange and transaction-related and account-related functions enabled through the platform 100. The registration component 112 may present to the consumer a registration form as the consumer joins for the first time, such as allowing a consumer to sign up for reminders or for bill payments or various other functions. The registration form may include a checkbox or other menu element asking about consumer preferences and options, such as whether the consumer would like to be able to pay bills via SMS or not. Upon selection of an option, the registration component 112 may request additional information from the consumer for completing the registration process. For example, the additional details may include consumer phone number, consumer address, consumer zip code, consumer personal details, and the like.

In embodiments, the registration component 112 may enable a standard registration process with the use of a set of APIs. The APIs may call on the consumer for registration, requesting the details mentioned herein, such as phone number, consumer ID, time zone, zip code, payment token, and the like. The registration component 112 may be coupled to or may include a mapping engine or mapping component 120 for processing authorization and mapping of the information received from the user during registration. In an example, the consumer may not have a token number, and the registration component 112 may send a signal to the mapping component 120 for generating a request to send an SMS to the consumer to setup a payment method. The consumer may then receive a message from the mapping component 120 or the server component 104 inviting the consumer to provide a PIN. Once the consumer enters the PIN, the mapping component 120 may validate the PIN as well as other information provided by the consumer for ensuring that the information is correct. If the information is found to be correct, the consumer may then be considered successfully registered with the platform 100.

In an example, the registration component 112 may enable a secure registration of the consumer with the platform 100. For example, the consumer signing up for the first time may be put through the registration process, wherein the registration component 112 seeks details from the consumer and confirms whether the consumer would like to be able to pay bills via SMS. Before an SMS is sent out to the consumer, the registration component 112 may confirm having the consumer information, such as PIN, accepted terms and conditions, payment token in certain cases, zip code, email address, valid phone number, and the like.

In other examples, the registration component 112 may enable additional ways of consumer registration. For example, the registration component 112 may send keywords to the consumer to trigger registration through SMS. The keywords may be unique per biller. A response may be sent by the registration component 112 to the consumer that may include a personalized URL that leads the consumer to a registration page on the white label consumer facing portal 102. In embodiments, registration may be enabled by an application programming interface to the platform. In another example, the registration may be completed through an IVR mode. In this example, an IVR system may be provided in the server component 104 that may be communicatively coupled to the registration component 112 and the mapping component 120. The consumer may call a number to register with the platform. IVR may collect consumer information including a payment token and may inform the registration component 112 about the collected information upon which the registration component 112 may request the consumer for the pin. Upon successfully providing the pin, the consumer may be registered with the platform 100.

The mapping component 120 may be configured to receive information that may be entered at different interfaces of the platform 100 and at different stages during performing different tasks by the biller or the consumer. For example, the biller may provide a list of consumer IDs that may be uploaded into the biller portal 108 by the biller, such as in a batch loading process or in a serial loading process. The consumer IDs may be stored in a storage component 122, for example in the form of rows, tables, etc., such as bill tables, consumer or biller account tables and the like. The biller may also upload other pieces of information, such as zip code, that may be used as a temporary password or identifier, or a secondary validation of a password or other identifier. The consumer may log into the white label consumer facing portal 102 using a consumer ID to identify the consumer and also may create a password for himself. Every bill uploaded by the biller may have a unique URL that points to the biller payment portal 108 and may facilitate in biller identified by the mapping component 120. In an example, the biller portal 108 may pull all the bills associated with a biller and a consumer from the bill tables stored in the storage component 122 and present the bills to the consumer by mapping of the biller and consumer information in association with different available/current bills by the mapping component 120.

In an online process of payment, the consumer may pay via a credit card or bank account. A payment request may be sent immediately to a tokenization engine 114 and to the payment processing component 118. The tokenization engine 114 may perform a token generation function and send an output to the processing component 118, so that the processing component 118 may execute preprogrammed instructions to process payments based on information received through the registration component 112 and the interface component 110 and verified or mapped by the mapping component 120. The processing and tokenization tasks may be handled differently for different billers, so that in some cases the processing of payment may be handled directly by the processing component 118 of the server component 104 or by the biller himself without routing processing through the host server component 104. Once the processing component 118 and/or tokenization engine 114 processes the payment, the processing component 118 may return the payment token. Subsequently, payment requests from the consumer may be associated with and may be charged against this token. Once the processing of payment is complete, the biller information may be stored in the storage component 122 by the processing component 118. In an online mode of payment processing, the consumer may provide his mobile phone number to opt into the payment service of the platform 100 and his PIN so that the consumer ID may be stored in a mobile phone table.

The host server component 104 may further include a notification component 124. The notification component 124 may initiate payment processing through SMS mode by sending out a bill notification once the bill from a particular biller is uploaded for the consumer. The consumer may then send the PIN that was previously created to approve the payment through an SMS. The processing component 118 may be configured to use the PIN and/or token to process the bill amount and, once approved, the storage component 122 may be updated for the respective biller.

While in some cases a message from a consumer may be quite simple, such as comprising only the PIN that approves payment, or returning a text with a prescribed letter (e.g., "P" for "pay"), in other cases the consumer may return a message that is more complex. The host server component 104 may therefore further include a message interpretation component 128. In an example, the messages sent by the consumer may be interpreted, such as based on pattern recognition, by the message interpretation component 128. Such patterns may, for example, relate to a set of keywords, common terms, alternate spellings (including misspellings), and the like. The keywords and associated message interpretation is discussed later in the present disclosure.

In embodiments the server component 104 or other component of the platform 100 may include a bill analytics component 130, which may ingest information about bills and enable various analyses and reports based on those, including ones that may be useful for billers and for consumers. For example, a biller may benefit from aggregated information about amounts due across multiple consumers, information about average timing of payments (including what portions are paid early, what portions are delayed), geographic information about bill amounts and payments, and the like. By ingesting many bills for many consumers, the platform 100 and the bill analytics component 130 in particular allows a biller to obtain insight about payment risks, payment patterns, debt repayment patterns, geographic patterns, and other factors that may guide activities of the biller. Similarly, the bill analytics component 130 may provide information for the host of the server component 104 or the consumer. For example, the bill analytics component 130 may provide reports as to the size of a bill relative to a past bill from the same merchant, the size of a bill relative to a past bill from another merchant, the timing of past payments to the merchant, the amounts of upcoming bills, the amount of interest that will be due on a late bill, and the like. The bill analytics component 130 may allow the host to provide intelligent notification to the consumer using the notification component 124. For example, the consumer may be notified if a bill is more than a certain percentage higher than a past bill of the same type. Similarly, a consumer who has made partial payments in the past may be offered an option to make a similar partial payment now. Various customized notifications may be created to benefit both consumers and billers.

The bill payment platform 100 as illustrated in FIG. 1 may include the two portals, namely, the white label consumer facing portal 102 and the biller portal 108. A user may use the bill payment platform 100 to pay bills to one or more merchants. The bills corresponding to the user may be uploaded by the biller on the bill payment platform 100. The process of payment of the uploaded bills on the bill payment platform 100 by the consumer/user may be explained as illustrated in FIG. 2A.

Figure 2A:
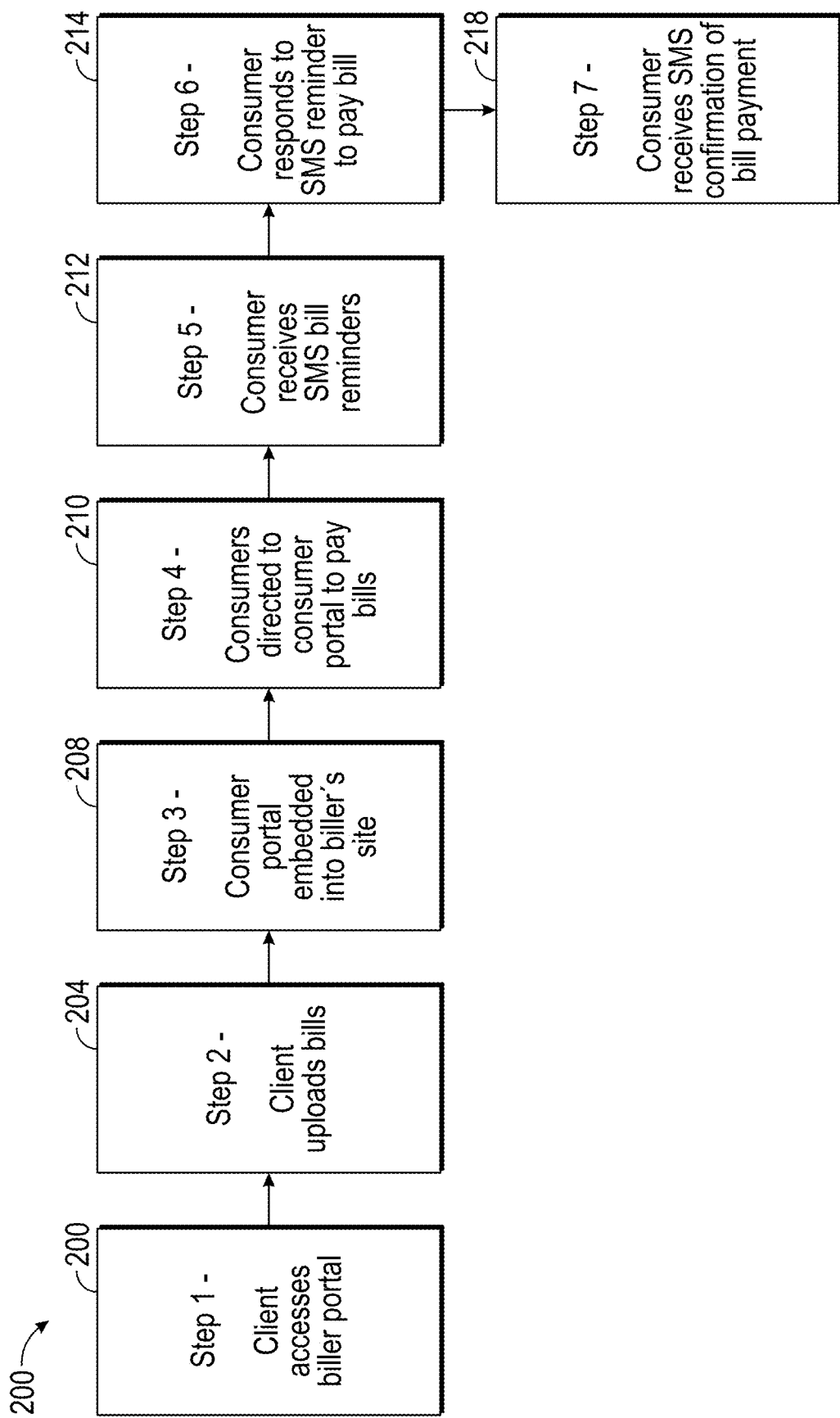
FIG. 2A illustrates a white label consumer facing portal and biller (e.g., merchant) portal use case for bill payment in accordance with an embodiment of the systems and methods disclosed herein.

The method 200 of FIG. 2A may include, at a step 202, accessing of the biller portal 108 of the bill payment platform 100 by a client. In an example, the client may be a biller of a mobile communication service provider, and the bills may relate to the monthly mobile usage charges of the consumers associated with the biller. In an example, the biller portal 108 may be a website that may allow the biller to perform functions related to managing of their customer's information. The website may be hosted by the host server component 104 associated with the bill payment platform 100. The bill payment platform 100 may be associated with a plurality of billers, wherein each biller may have his own biller portal 108.

After a biller accesses his biller portal 108 he may be able to perform a plurality of functions associated with his consumers. As illustrated in FIG. 2A, at a step 204, the biller may upload the bills corresponding to multiple consumers on the bill payment platform 100. In an example, the bills may be uploaded, such as using the portal interface component 110 of FIG. 1, which may interface with the biller portal 108. The bills may include information pertaining to a number of parameters such as, consumer id, bill description, bill amount, password (typically zip code) and due date. The consumerID may be used to uniquely identify each customer on the billing platform 100. Once the bills are uploaded, they may be available for viewing or paying or performing other such actions by the different consumers registered on the bill payment platform 100. The consumers may access the uploaded bills using their consumer portals, such as the consumer portal 102. When a consumer accesses his consumer portal 102, such as by accessing the biller's website, he may be presented bill-related information. Each consumer portal may be identified by a consumer ID parameter. At step 208, the consumer portal 102 may be embedded into the biller's website. The embedding may be performed by such as the mapping component 120 of FIG. 1. Further, at step 210, the consumer may be directed to his consumer portal 102 to pay his uploaded bills. In an example, the customer may receive an SMS containing a link or a URL from which the customer can pay the bill. In another example, the URL for bill payment may be sent to the customer via email.

If the consumer decides to pay his bill, then at step 212, the consumer may receive SMS reminders with the amount due, due date, description and the like. For example, the notification component 124 of FIG. 1 may identify pending bills of the consumer and initiate sending of a message, such as the SMS, to the consumer. As noted above, notifications may be based on context, including as reflected by analysis using the bill analysis component 130. For example, a user may be prompted to pay a late bill from a merchant before being prompted to pay a bill that is not yet overdue. At a step 214, the consumer may respond to the SMS reminder to pay the bill. Further, at step 218, in response to consumer's confirmation to pay the bill, the bill, or a portion thereof, may be paid, and the consumer may receive a confirmation for payment of the bill and/or a revised accounting of the amount due in a case of partial payment. In an example, the SMS communication may be performed by the notification component 124 of FIG. 1, in response to processing of bill payment performed by the payment processing component 118 of FIG. 1. In an example, the consumer may decide to pay his bills using his credit card. Once the payment is successfully processed, the tokenization engine 114 may store a payment token with the credit card information of the consumer, in the storage component 122.

Figure 2B:
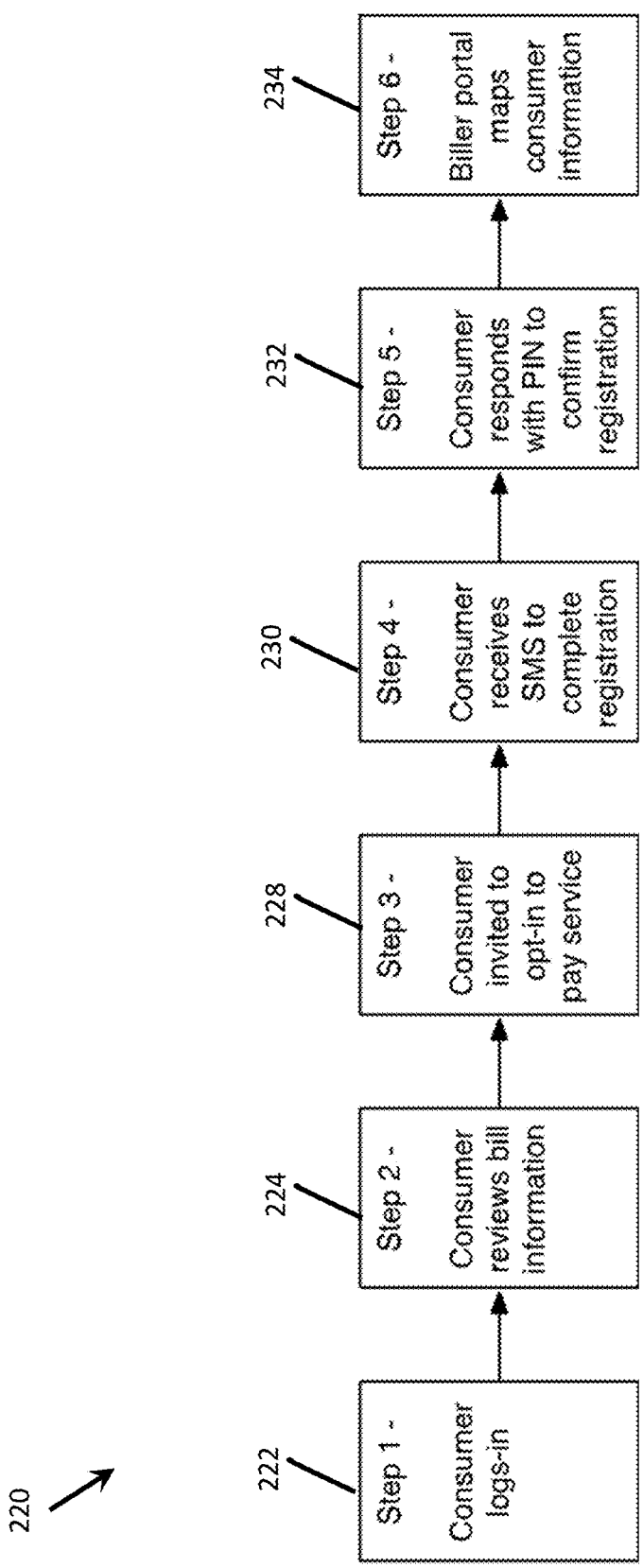
FIG. 2B illustrates a bill payment opt-in process for a white label, consumer facing portal and biller (merchant) portal for bill payment in accordance with an embodiment of the systems and methods disclosed herein.

FIG. 2B illustrates a bill payment opt-in process for the white label consumer facing portal 102 and the biller portal 108 use case for bill payment in accordance with an embodiment of the systems and methods disclosed herein.

The method 220 of FIG. 2B may include, at 222, logging in to the bill payment platform 100 by a consumer. In an example, the consumer may log in by entering his bill ID and a password. The password may include the zip code of the consumer, in an example. The consumer may enter his login details at a login form that may be provided by the white label consumer facing portal 102. The login details of the consumer may be used to identify the consumer uniquely on the bill payment platform 100.

Once logged in, the method may further include, at 224, reviewing of the bill information by the consumer, such as the bill information retrieved from the storage component 122 on the basis of the consumer ID of the consumer. After reviewing the bill information, the consumer may want to make payment of the bill using his credit or debit card on the bill payment platform 100. If the consumer is registered with the platform 100, he may make the payment and successful payment of bills may result in the creation of a payment token that may be stored in the storage component 122 and can be used to facilitate future payment transactions. However, if the consumer is accessing the bill payment service for the first time on the bill payment platform 100, then at 228, the consumer may be invited to opt-in to register for use of the pay service of the bill payment platform 100.

If the consumer decides to opt-in, the consumer may be asked to enter his phone number, such as his mobile phone number. This phone number may be used by the consumer for exchanging messages for registration and payment processing.

At step 230, the consumer may receive an SMS or text message to complete the registration process associated with the entered phone number. For example, the consumer may receive an SMS sent from the notification component 124 to the phone number provided by the consumer. In an example, the SMS may request the consumer to enter a short code, such as a pin number, that may be used to authenticate the consumer for registration on the bill payment platform 100.

In response to receiving the SMS, at 232, the consumer may respond with the PIN number to confirm registration as an authenticated user on the bill payment platform 100. In an example, the consumer may be able to choose from one of the various use cases of registrations, such as a standard registration and a confidential registration. If the consumer chooses the standard registration, the registration may proceed normally with the exchange of the PIN. However, if the consumer chooses confidential registration, the PIN may be kept hidden from exposure on the network of exchange of communication. In this case, the consumer may receive the notification for registration via an SMS, but the authentication of the consumer may be handled securely online. In an example, the message exchange for registration and authentication of the user may be handled by the notification component 124 with the use of a set of APIs implemented on the bill payment platform 100. Once the consumer is authenticated, the registration may be confirmed. For example, the consumer may enter the PIN and send through an SMS. In return the consumer may receive a "Thank you" or "PIN set successfully" or any other message confirming the registration.

Once the consumer is registered, then at 234, the biller portal 108 may map the consumer information with corresponding bills. The mapping may be performed by the mapping component 120 as discussed in FIG. 1. The mapping may be performed for three pieces of information, the consumer id, the payment token, and the combination of consumer's phone number and corresponding PIN number. Other factors may also be used, such as in multi-factor authentication, including biometric factors, factors based on answering user-specific questions (e.g., amounts of past bills) and the like. The consumer may then access the bill payment platform 100 for making payments for any number of bills. In an example, when the consumer is making the payment, he may be requested to provide additional information identifying consumer preferences. The consumer may be shown a checkbox on the webpage that may be used to assess the consumer's choice regarding mode of making payment. For example, the checkbox may display a text asking: "Would you like to be able to pay bills via SMS?" If the consumer clicks this option, he may be required to provide additional information, such as a phone number. If the consumer's phone number is already available in the server 104, it may be pre-populated. In embodiments, only a pre-validated phone number may be pre-populated. An invalid phone number may not be pre-populated. In embodiments, validation of the phone number may be performed in a separate process.

The consumer may also be required to provide confirmation for acceptance of terms and conditions of the biller. Additionally, the consumer may be required to provide a time zone. The time zone of the consumer may be used to identify an appropriate time for sending SMS reminders to the consumer. This may be an important aspect in making the bill payment platform 100 globally popular and suitable. In an example, the time zone may be identified from the zip code information provided by the consumer.

The consumer may also be sent reminders to pay bills based on mapped information. In an example, the consumer may be asked for reminders at the time of registration. In other examples, the reminders may be set-up at the time of payment by credit or debit card, or the consumer may be notified through an email sent by the biller. The consumer may also be able to set-up reminders on the consumer portal 102. If the consumer signs up for reminders for bill payment, he may be sent SMS reminders that may include a link, such as a URL, which may be accessed by the consumer to make payment for the respective bills.

FIGS. 3A-3D illustrate details of a user interface of the consumer facing portal 102 and a user interface of the biller (e.g., merchant) portal 108 for enabling the biller to arrange for its customers to undertake bill payments in accordance with an embodiment of the systems and methods disclosed herein.

Figure 3A:
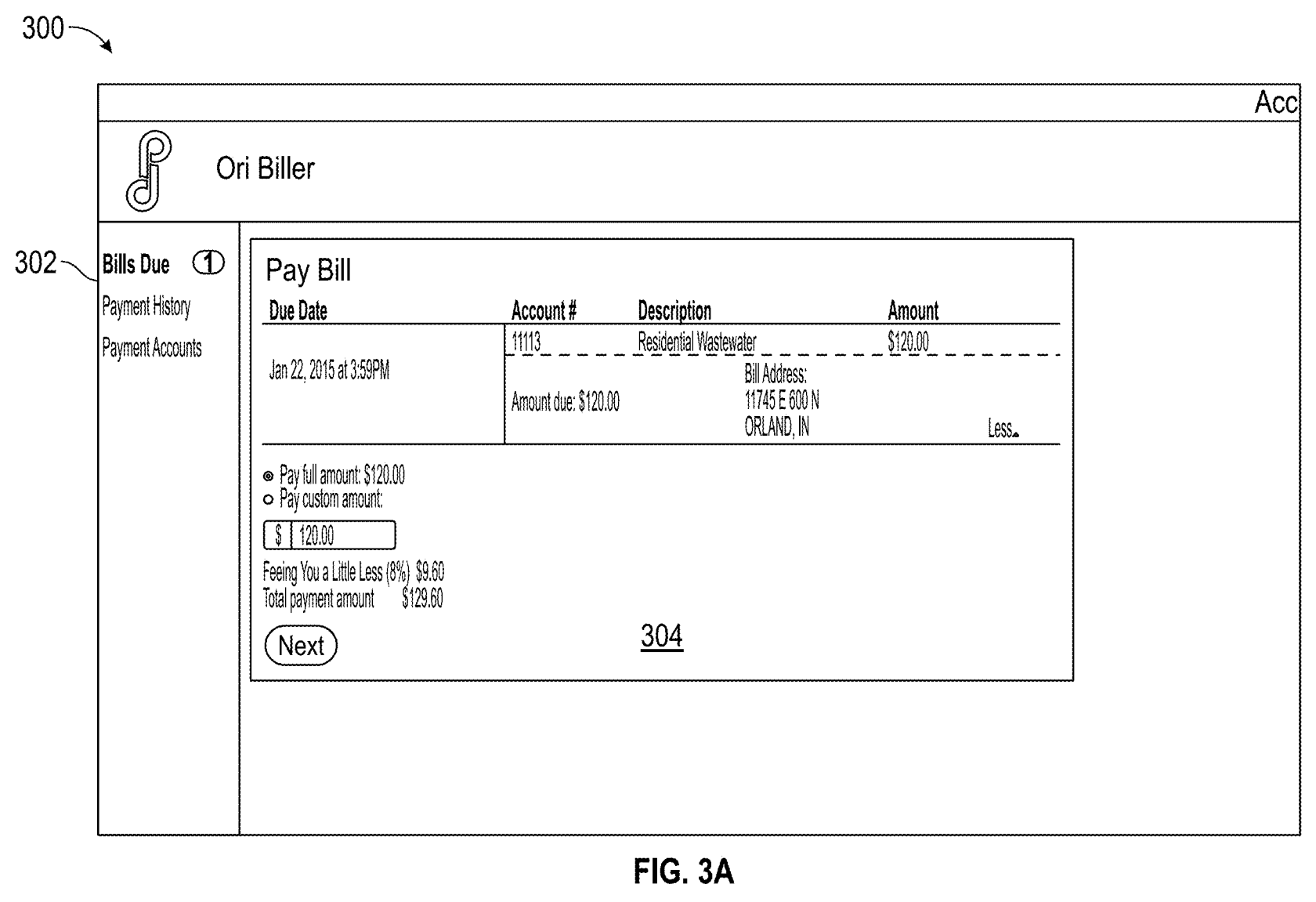

For example, FIG. 3A illustrates a user interface 300 that may be presented to a consumer through the white label consumer facing portal 102 for allowing the consumer to pay the consumer's bills associated with a biller. The user interface may include, for example, menu icons 302 for selecting options during the bill payment process, such as to view due bills, view or export payment history of the consumer for the biller, payment accounts of the consumer, and the like. For example, as illustrated in FIG. 3A, the menu icons show that the consumer has one bill due to be paid to the biller. Upon selection of a respective option to pay the bill to the biller, the consumer may be redirected to an interface section 304 that allows the consumer to input requisite details to pay the due bill. The interface section may also present details of the due bill to the consumer. In the illustrated example, the consumer has a $120 bill amount payable to the biller through the white label consumer facing portal 102. Upon confirmation of the presented details, the consumer may opt next step in the process of bill payment that may lead to submission and approval of the details by the consumer for payment execution.

Figure 3B:
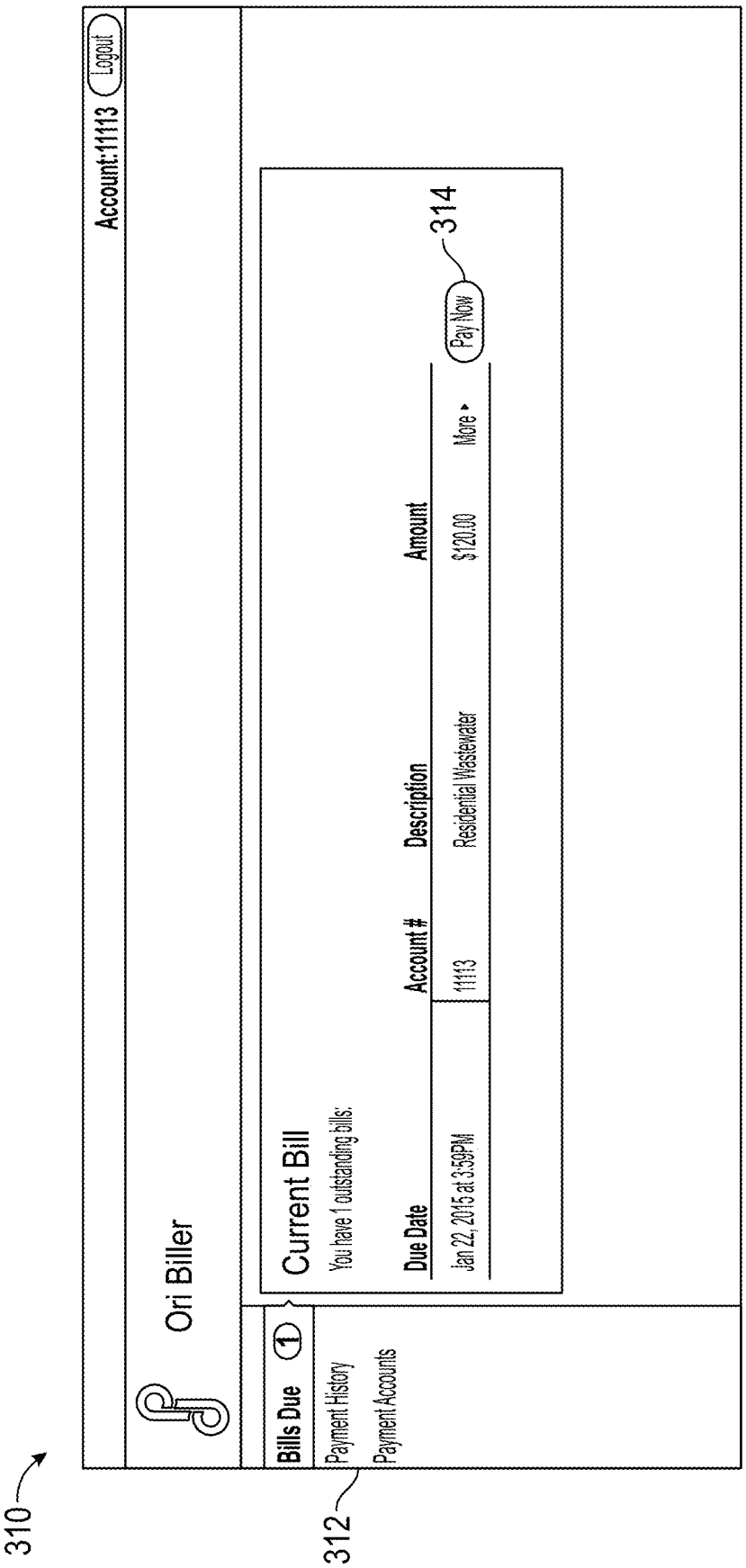

The white label consumer facing portal 102 may launch another user interface 310 as shown in FIG. 3B to allow the consumer to view current bills. Upon selection of the option of due bills from the menu icons 312, the user interface 310 may present the due bills to the consumer such as shown in FIG. 3B. Since the consumer has only one due bill in this example, the user interface 310 presents the only pending bill in front of the user. The consumer may select a 'Pay Bill' option 314 that may redirect the consumer to the user interface 310 and the consumer may view bill details and/or input consumer details for allowing a successful authorized payment as discussed above.

Figure 3C:
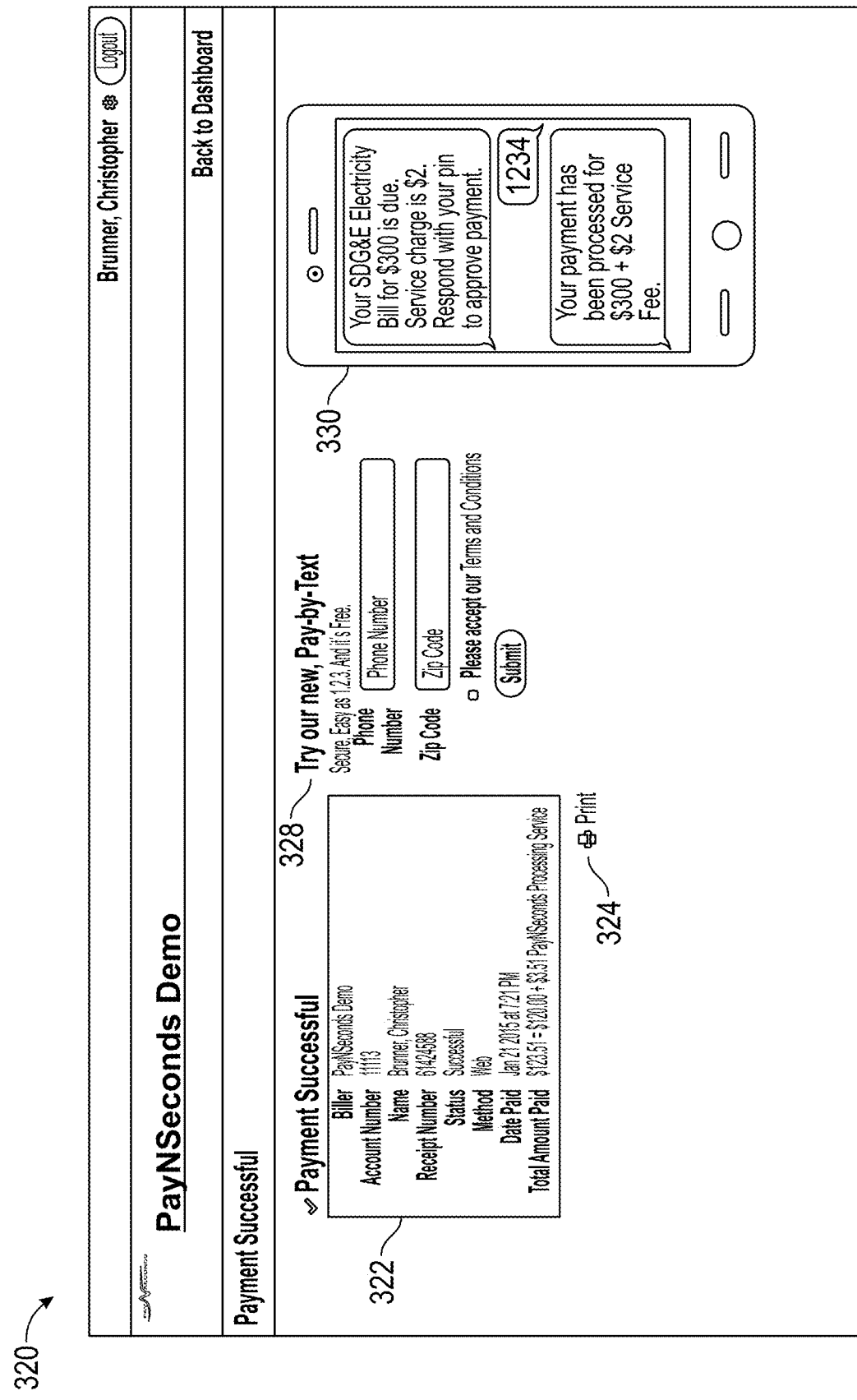

Upon successful completion of a payment transaction or bill payment, the white label consumer facing portal 102 may launch another user interface 320 as shown in FIG. 3C to allow the consumer to get confirmation of the successful bill payment and to view a payment summary 322 for the successful payment. The consumer can also receive the payment summary 322 through an email or SMS separately for future records. The payment summary 322 may include details such as biller name, account number, name of the debtor, receipt number, status (of payment), payment method, mode of payment, date of payment and total amount of payment, and the like. The consumer may be able to print the summary 322 using a 'Print' button 324 provided on the interface 320. The consumer may be presented another option of making a payment such as the 'Pay-by-Text' option 328. In accordance with this option, the consumer may be asked to enter phone number and zip code in corresponding text boxes. The consumer may also be presented a checkbox to accept terms and conditions. The consumer may be presented an alternate graphic icon 330 to show other bills due for the consumer.

The white label consumer facing portal 102 may launch another user interface 340 as shown in FIG. 3D to allow the consumer to make bill payment upon selection of the option to 'Pay Bill' as shown in FIG. 3B. The user interface 340 may present details such as the amount of payment due to the consumer. For example, the interface 340 shows that the consumer has an amount of $120 due for payment. The user interface 340 may include different text boxes 342 to receive information related to the consumer and mode of payment. For example, the user interface 340 may present the 342 text boxes for entering card number, name on card, expiration date (of the card), ZIP code, email address, and other details related to the consumer. The user interface 340 may correspond to the use case where the consumer may have decided to pay the bill using a credit or debit card. The user interface 340 may ask the consumer to enter the amount to pay to the biller. The use interface 340 may present a payment summary based on the payment. The user interface 340 may also present a graphic icon 344 to inform the consumer that the payment is processed using secure mode.

Figure 3E:
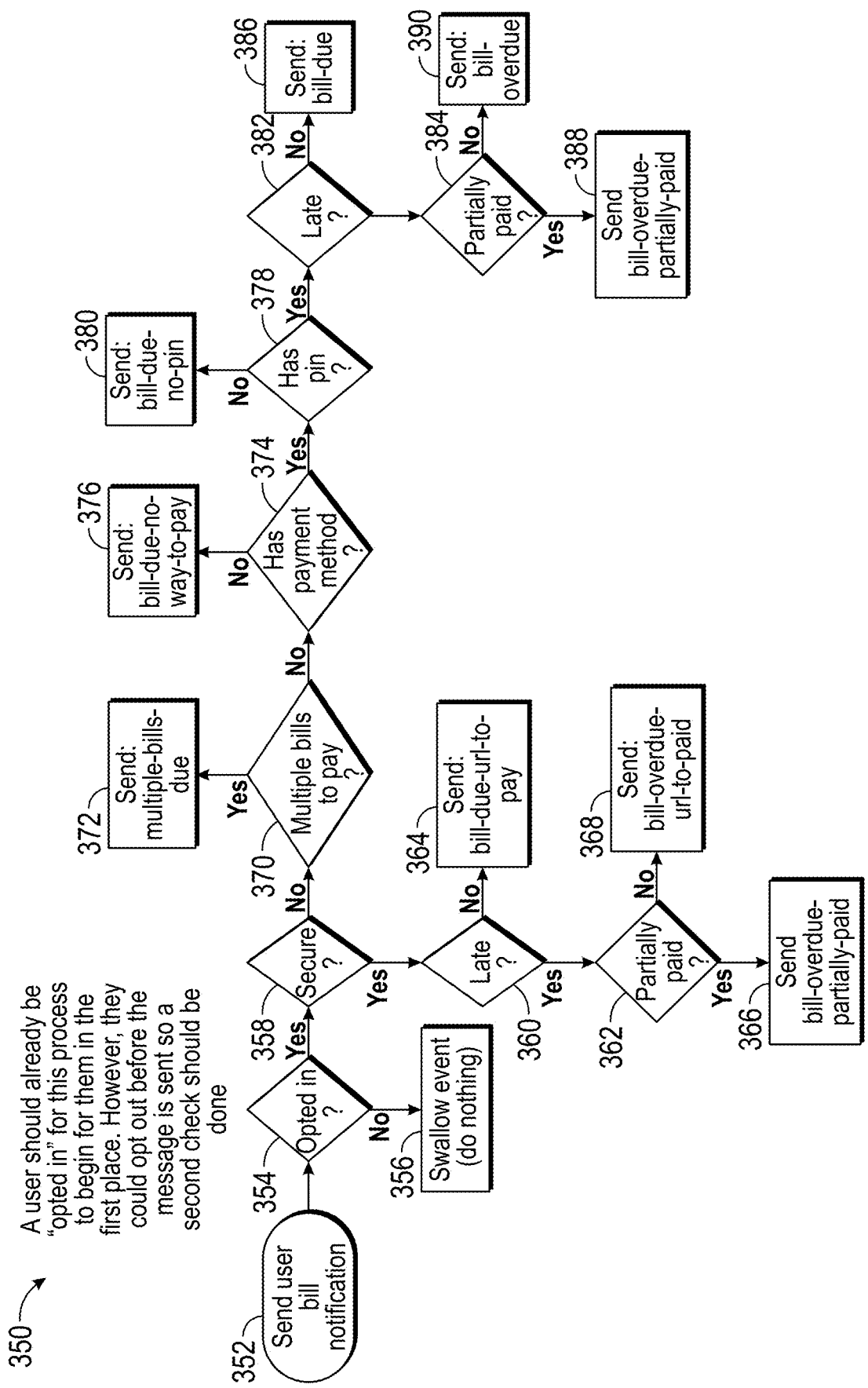
FIG. 3E illustrates a bill notification process for a white label consumer facing portal and biller (e.g., merchant) portal for bill payment in accordance with an embodiment of the systems and methods disclosed herein.

FIG. 3E illustrates a flow diagram by which various processes are undertaken using the components described in this disclosure, based on determination of certain states, such as whether there are multiple bills due, whether the user has a PIN, whether the user has opted in for mobile payments, whether the payment is late/overdue, whether there has been a partial payment made, and whether security has been verified. In the flow 350 of FIG. 3E, a bill notification is sent at a step 352 to a user, and at a step 354 it is confirmed that the user is opted in to receive bills via the platform 100. If not, for example, if a user has opted out subsequent to previously opting in, then no further activity will proceed (as noted in the swallow event step 356). If the user is confirmed at the step 354 to be (still) opted in, then at a step 358 it is determined whether the user is secure. If so, then at a step 360 it is determined whether the user is late in a payment. If not, then at a step 364 a message is sent, such as in the format: "bill-due-url-to-pay," indicating a bill is due to pay, optionally including a URL. If the bill is late, then at a step 360 it is determined whether the bill is partially paid. If not, then a message is sent at a step 368 to indicate the bill is overdue, optionally including a URL to pay. If the bill is partially paid, then at a step 366 a message is sent indicating a bill is overdue and partially paid, optionally including information about the partially due amount. If at the step 358 security verification is needed, then at a step 370 it is determined whether there are multiple bills to pay. If so, then at a step 376 a message is sent regarding multiple bills to be paid. If not, then at a step 374 it is determined whether the user has a payment method. If not, then a message is sent at a step 376 indicating that there is no way for the user to pay the bill. If so, then at a step 378 it is determined whether the use has a PIN. If not, then a message is sent indicating the bill is due and there is no PIN, such as in the format "bill-due-no-pin." If there is a PIN, then at a step 382 it is determined whether a bill is late. If not, then a message is sent at a step 386 indicating that a bill is due. If the user is late, then at a step 384 it is determined whether the bill is partially paid. If not, then a message is sent at a step 390 indicating the bill is overdue. If the bill is partially paid, then a message is sent at a step 388 indicating the bill is overdue but partially paid, optionally including the overdue amount.

FIG. 3F illustrates an example of a user interface 392 for uploading of bills by the biller. In an example, the user interface 392 may be presented to the consumer such as upon selection of an upload option from a menu 394. The user interface 392 may display the biller name and other elements (such as a logo, preferred colors, and other branding elements) on top of the interface 392. The user interface 392 may present to the consumer status 396 and summary 398 of the bills uploaded on the biller portal. For example, the user interface 392 may display whether the bills are uploaded successfully or not. The user interface 392 may provide an option 399 for downloading a report or bills. The user interface 392 may allow tracking of processing of upload tasks and be notified of any errors during the upload. The user interface 392 may be refreshed to update information presented therein. The user interface 392 may also allow creating a link to this page so as the consumer to come back to the same page to check the progress of upload.

FIG. 3G illustrates an example of another user interface 3000 that may be presented to the consumer, such as upon selection of the upload option from the menu 394 as shown in FIG. 3F. The user interface 3000 may include two display areas, a left display area 3002 and a right display area 3004. The left display area 3002 may provide an option of choosing a file for upload to the biller. The right display area 3004 may list types of files that may be accepted by the biller portal 108 and other guidelines required during upload. For example, the right display area 3004 shows that the biller must upload a file of a .CSV format, the file must contain header row, and other similar required details.

Figure 3H:
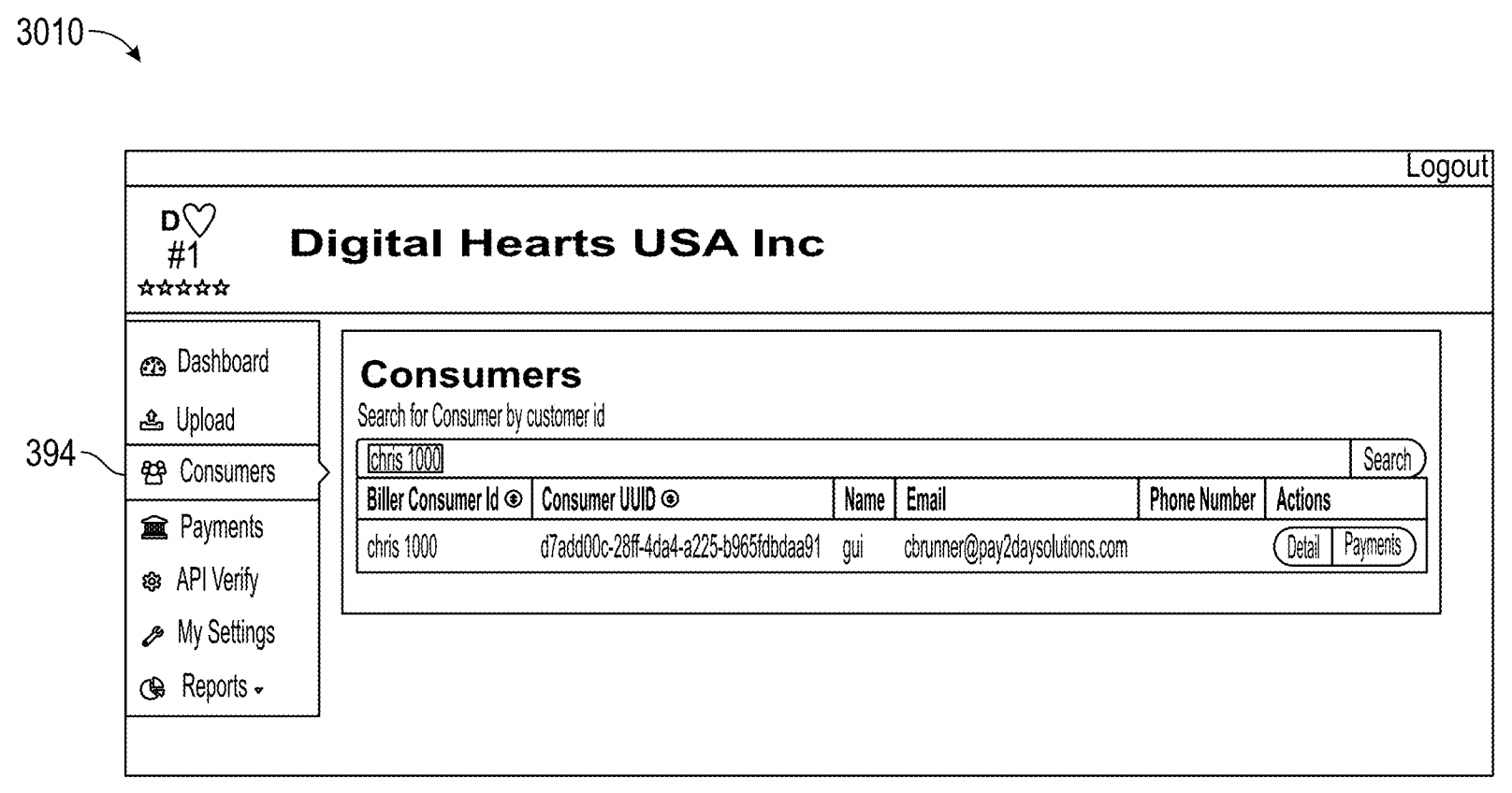

FIG. 3H illustrates an example of a user interface 3010 that may be presented to allow to search for the name and other details associated with a specific consumer, such as by selecting the option of 'Consumers' from the menu 394. The user interface 3010 may allow for searching for consumers such as by using a customer ID or other such consumer specific details in various embodiments. An output including consumer details may be presented to view on the user interface 3010. The output may for example, include customer name, email address, contact number, and other such details. The output may also enable to perform various actions such as to make payments or to view bills, and the like, for which the consumer may be redirected to different pages based on an option selected or action performed.

FIG. 3I illustrates an exemplary user interface 3020 that may be launched such as upon selecting 'Payments' option from the menu 394. The user interface 3020 may present a complete record or summary of payments made in a specific period of time, such as 30 days, by a specific consumer. The user interface 3020 may display payments-related information, such as payment version, surcharges and late fees, amount due, due date of payment, date of creation of payment record, currency (of making payment), biller's bill id, consumer biller account UUID, whether the payment was late, and the like. For example, the user interface 3020 may display that a payment request corresponding to a consumer was created on Mar. 5, 2015 and is due on Mar. 22, 2016.

Figure 3J:
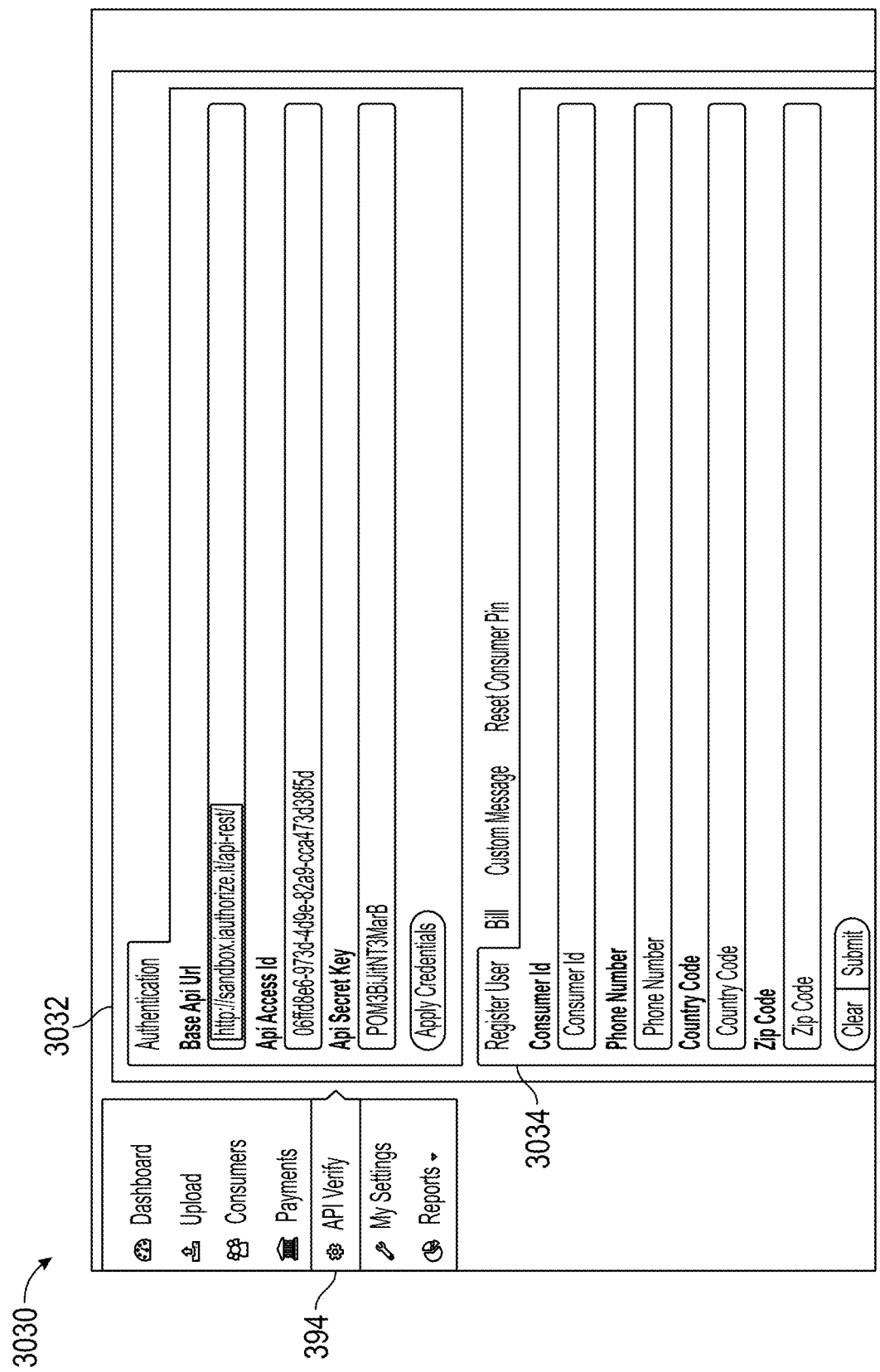

FIG. 3J illustrates another example of a user interface 3030 that may be presented upon selection of the 'API verify' option from the menu 394. The user interface 3030 may be used to provide consumer's authentication related information in an input form 3033. The input form 3033 may include multiple fields that may provide input text boxes for inputting multiple values. The fields may include such as a base API url field, an API access ID field, an API secret key field and a button labeled 'Apply Credentials'. When a user clicks on the button 'Apply Credentials', multiple inputs provided in the authentication form may be submitted to the bill payment platform 100. The user interface 3030 may include another form 3034 that may have multiple options for input such as register user, bill, custom message and reset consumer pin. For example, upon selecting the 'Register User' option, multiple text boxes may be presented that may request details such as consumer id, phone number, country code, zip code, and the like. In an example, the user interface 3030 may be used to input parameters from the biller side that may be used for implementing API calls for a consumer's authentication during registration, as discussed previously.

FIG. 3K illustrates a user interface 3040 that may be presented such as on selecting the 'My Settings' option from the menu 394. The user interface 3040 may be used to edit biller-related information. For example, the user interface 3040 shows that the information related to the biller 'Digital Hearts USA Inc' can be edited from the user interface 3040 by using one of the multiple options presented to the biller. The user interface 3040 may present a form providing multiple input fields to the biller. The fields may be related to, for example, name, mobile friendly name, login page URL, API Access ID, API secret key, various checkboxes, Email Address field, and the like, each being associated with the biller. The biller may edit associated information entirely or partially by providing input through the user interface 3040 and saving it with the platform 100. The user interface 3040 for example may allow the biller to upload a new logo, make adjustments to fees etc., update or edit templates, send or update payment notifications, and other such tasks without limitations.

FIG. 3L illustrates an exemplary user interface 3050 that may be an extension of the user interface 3040. The user interface 3050 may display all the fields displayed in the user interface 3040 and additionally input text boxes for providing input for 'Help Email', 'Login Welcome Message', and 'Page Footer', and the like.

In accordance with various embodiments, the platform 100 may present user interfaces that may enable the platform 100 to collect a variety of consumer specific information so as to perform or authorize or authenticate various financial transactions associated with the consumer. The consumer specific information may include for example demographic information such as name of the consumer, sex, age, marital status, guardian name, father name, mother name, husband/wife name, education, nationality etc.; psychographic information such as attitudes, personality values, interests, hobbies, lifestyles, opinions, behavior, etc.; spending history such as spending amount over a defined time period, goods purchased, types of goods purchased, recent spending behavior, spending summary, average spending per day, total last year spending, total current year spending, average growth in spending, direct spending, indirect spending, spending under different sectors such as health spending, education spending etc.; location such as country, state, district, society, street address, local address, permanent address, office address, ZIP code, etc.; account information such credit card number, debit card number, card name, card expiration date, PIN number, bank name, bank address, bank branch name, etc.; bill related information such as amount of bill, due date, number of pending bills, overdue conditions, penalties and interests, surcharges, rewards available, discounts available, contextual information such as other bills, related bills, other bills for the same biller, total debt, credit rating, credit reports, regulatory constraints; and other information pertinent to the consumer such as contact number, mobile phone number, friends and family, consumer social profile, savings, and the like.

Figure 4:
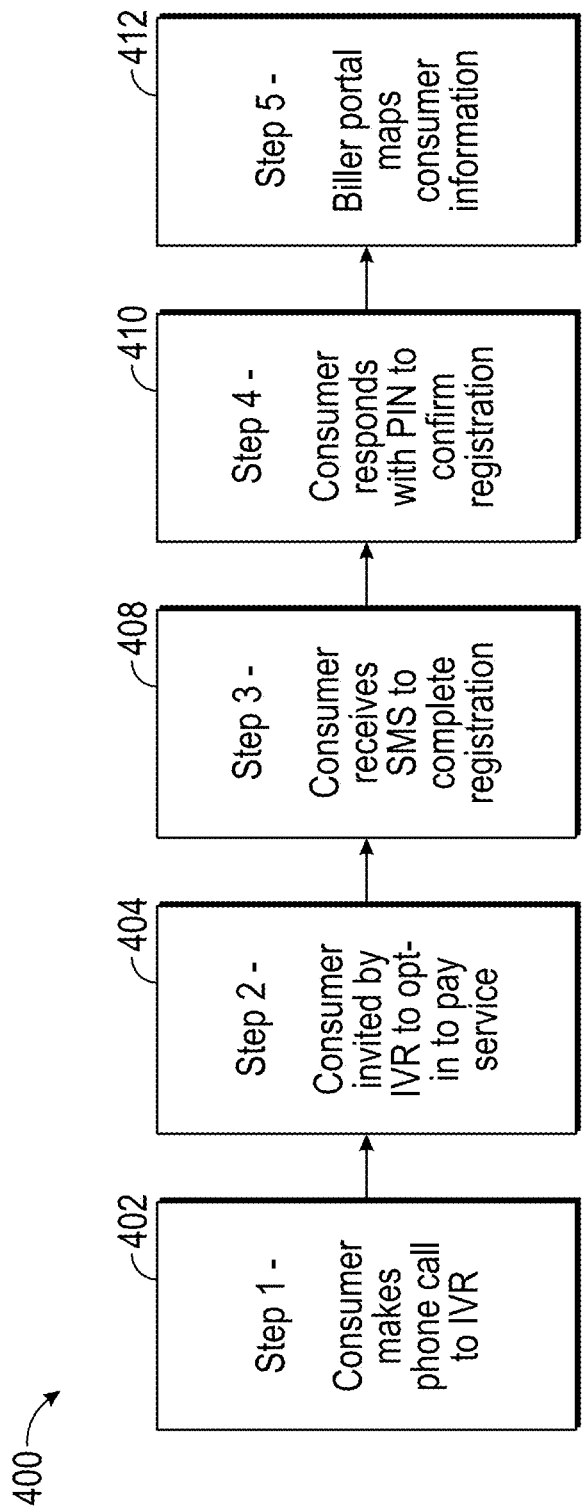
FIG. 4 illustrates an IVR use case for bill payment in accordance with an embodiment of the systems and methods disclosed herein.

FIG. 4 illustrates an IVR use case for bill payment in accordance with an embodiment of the systems and methods disclosed herein. The IVR use case illustrated in FIG. 4 represents an alternate embodiment of the registration process of the consumer for bill payment service on the bill payment platform 100. In this embodiment, the functions of the bill payment platform 100 remain similar to the embodiments discussed previously. However, the interfacing of the consumer with the bill payment platform 100 takes place through a telephone call instead of the consumer logging online to the consumer portal 102. The process is illustrated in the method 400 of FIG. 4, as explained below.

The method of FIG. 4 may include, at 402, making a phone call to the IVR system of the biller by the consumer. For example, the consumer may make a call to an advertised phone number or a customer care number of the biller. The consumer's call may be directed to the IVR system. The IVR system may present a plurality of options to the consumer. At 404, the consumer may be invited by the IVR system to opt in to the payment service of the biller. For example, the consumer may be asked to "press 1" to opt in to the bill payment service of the biller. In an example, the bill payment service may include payment by SMS service provided by the biller, and as discussed herein.

If the consumer decides to opt in, such as by pressing 1, then at 408, the consumer may receive an SMS to complete registration for the payment service of the biller. In response to the SMS, at 410, the consumer may send a short code, such as a PIN number to confirm the registration for the payment service. Once the consumer's response is received at the bill payment platform 100, at 412, the biller portal 108 may perform mapping of consumer information. The mapping may be performed by the mapping component 120. The mapping component 120 may map consumer related information with the bill payment information. For example, the mapping component 120 may map the consumer id, the payment token, and the phone number and PIN number combination of the consumer with the information pertaining to the bill paid by the consumer. The payment processing and other registration functions may be similar to those discussed elsewhere herein.

In an example, the payment related functions may be supported by an API based process. The actions/functions related to bill payment processing, such as bill uploading, consumer registration, bill payment and the like may be supported by API based calls. The API calls may be configured to handle payment of bills by the consumer using SMS technology.

In an example, the SMS messages sent from the consumer may be interpreted by the message interpretation 128 component, as illustrated in FIG. 1. In an example, the messages sent by the consumer may be interpreted based on pattern recognition. Such pattern may relate to a set of keywords. The keywords may correspond to a set of commands, such as illustrated in the table below:

IAuthorize.it/IAuth.it: SMS Commands

| Command | Description | Synonyms |
| --- | --- | --- |
| help | Probably how you got here. Gives you some guidance on how to get some help if you are stuck. | |
| stop | Marks your phone number to not be sent SMS messages from the sending phone number/short code anymore. | opt out, quit, unsubscribe |
| opt in | Tells the short code it can re-send you messages again. This will ask for you to setup a pin again. | |
| Pay [half] | Pay a stated fraction of the amount due on a bill (e.g., half) | Partial, pay some |
| [4 digits] | Any 4 numerical digits will be viewed as your pin. Depending on what message you are replying to, this will set your pin or approve payment for a bill. | |

-continued

| Command | Description | Synonyms |
| --- | --- | --- |
| due | You will receive an SMS with a list of your currently open bills. | open bills, what do I owe, bills?, dew, du |
| paid | You will receive an SMS with a list of the bills you have paid. | closed bills, what have I paid, payments, pd |

The commands may be interpreted by use of various technologies available for command interpretation, such as semantic processing, context-based text interpretation (for example, interpret a message based on the time, location, or nature of the bill, whether the bill is overdue, whether the consumer pays the bill in full every month) and the like. Contexts may be determined in part based on analysis, such as using the bill analysis component 130 noted above. The interpretation of commands may be used to perform payment related functions such as, providing confirmation for payment initiation, providing billing history to the consumer, determining the success of a payment, display of available balance in a consumer's account, offering a partial payment option, and the like.

Figure 4A:
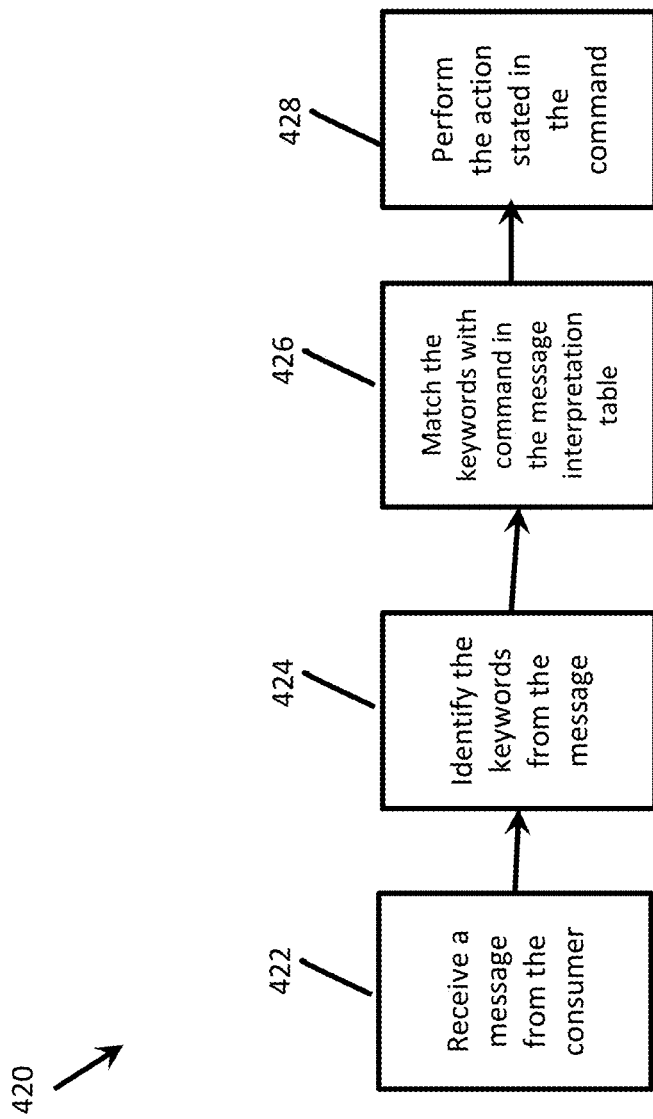
FIG. 4A illustrates a method for performing message interpretation.

FIG. 4A illustrates a method 420 for performing message interpretation. The method may include, at 422, receiving a message from the consumer. The message may be received by the notification component 124 illustrated in FIG. 1. At 424, the message may be interpreted to identify the keywords included in the message. The keywords may correspond to a set of predefined keywords that may be made available to the consumer at the time of registration, or when the user decides to opt in for bill payment service. These keywords may correspond to a set of commands such as illustrated in the table above so that each command may correspond to a specific action. The message may be interpreted by the message interpretation component 128 of the bill payment platform 100, as illustrated in FIG. 1. The message interpretation may include, at 426, matching the keywords in the message with the contents of the different rows of the table. The first column of each row may include the keyword, and the next column may include interpretation of the keyword to perform a specific action. At 428, wherever the keywords sent by the consumer match with the contents of a cell in the first column of the table, the action associated with that command may be performed.

In an example, the message may be interpreted by implementing a set of rules or logic at the message interpretation component 128. The logic may be configured to interpret the message based on a set of constraints, such as status of a user, such as whether the user has opted, does the user has an outstanding bill for payment and the like; a historical SMS pattern of the user, such as past activities; and a message context.

Figure 5:
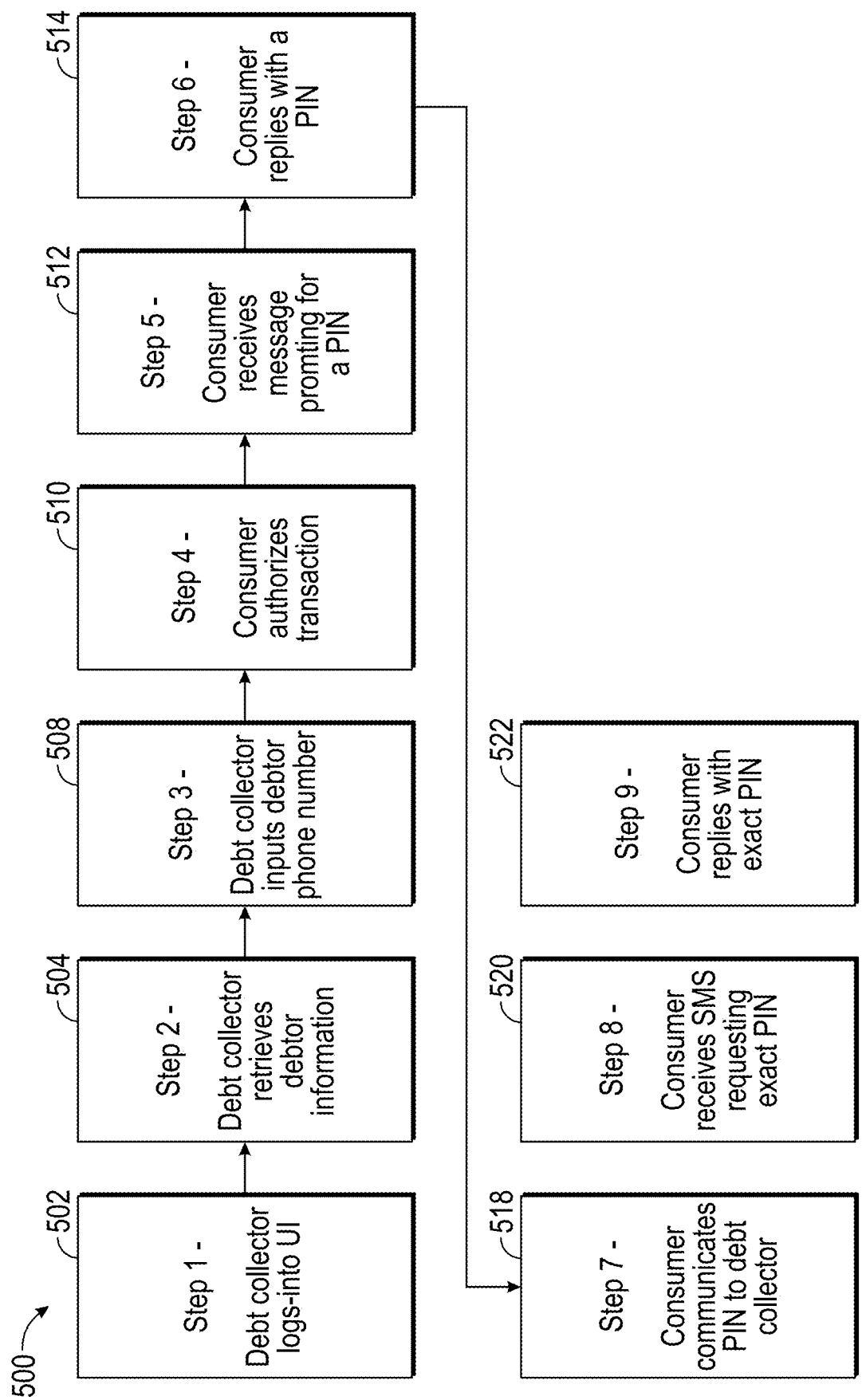
FIG. 5 illustrates a Regulation E compliant bill payment process and system in accordance with an embodiment of the systems and methods disclosed herein.

FIG. 5 illustrates a Regulation E compliant bill payment and/or debt collection process in accordance with an embodiment of the systems and methods disclosed herein. The method 500 illustrated in FIG. 5 may describe an embodiment that is in compliance with the Regulation E, hereinafter referred to as Reg. E, guidelines for Electronics Funds Transfer (EFT). The Reg. E guidelines require that a bill collector needs to perform certain bill collection activities, such as making mandated disclosures and obtaining certain acknowledgements or consents, prior to bill collection and/or prior to acceptance of payments by the consumer, in certain situations. Compliance with Reg. E is very difficult for debt collectors that use conventional methods, such as making phone calls and soliciting a debtor to pay immediately, such as by sending an unsigned check or debit card account number. Collection of payments in compliance with Reg. E may be supported by embodiments described throughout this disclosure.

Thus, an implementation ensures compliance with Regulation E. According to Reg. E guidelines, all EFTs that use Electronic checks/ACH or debit cards must be authorized in writing, signed or similarly authenticated by the consumer. In addition, Reg. E requires that if a debt collector sets up a series of recurring EFTs with the consumer, such as on a monthly basis for bill payments, the debt collector must obtain a signed written authorization from the consumer regarding the same. The debt collector must also provide the consumer with a copy of the authorization. In addition, if the amount of funds varies from EFT to EFT, further notices may also be required. The debt collector may obtain an audio-recorded verbal authorization from the consumer, such as over a phone call, provided appropriate disclosures are made. The embodiments may be provided in compliance with Reg. E guidelines by the use of the biller portal 108 of FIG. 1, wherein, at step 502, a debt collector, such as the biller, may log into to the biller portal 108 and at 504, may obtain debtor information and further, at 508, may input the caller phone number. At 510, the consumer may then provide authorization for transactions such as payment of pending bills using the bill payment platform 100 from the caller phone number, such as over a call, or in certain preferred embodiments, by an exchange of text messages that include any required disclosures and authorizations. Once the consumer authorizes the transaction, at 512, the bill payment platform 100 may send a message to the consumer, such as an SMS, as discussed in connection with various embodiments disclosed herein, prompting the consumer to enter a PIN. The consumer may then, at 514, respond with a PIN number. For example, the consumer may set year of birth as his pin. Additionally, at 518, the consumer may communicate the pin to the debt collector. In an example, the consumer may communicate the PIN number to the debt collector over a call. The consumer may further, at step 520, receive an SMS that may require the consumer to send an exact PIN. This may enable further confirmation of the consumer as the authentic caller and sender of the SMS. The consumer, at 522, replies with the exact PIN to authenticate as a genuine caller.

As noted above, the use of debit card payments and other payments processed directly from a checking account by electronic means, including an authorization to transfer funds by telephone, constitute electronic fund transfers ("EFT") as defined by the federal regulation 12 C.F.R Section 1005.3(b) and governed in the United States by Regulation E, which requires a financial institution to make the initial disclosures prior to any EFT being processed on the checking account. These initial disclosures include, as applicable: notice of liability of the consumer for unauthorized payments; the telephone number and address of the company for notification if an unauthorized transfer occurs; the business days of the company; limitations on types of transfers; fees; documentation and notice of preauthorized EFT procedures pursuant to C.F.R. § 1005.10(a) and (d) and a summary of the consumer's rights and procedures for stopping payment(s).

For pre-authorized transfers and recurring payments, there are additional required disclosures, referred to herein as the "Regulation E Pre-authorization Disclosures." A "preauthorized electronic fund transfer" refers to an electronic fund transfer authorized in advance to recur at substantially regular intervals. Regulation E requires written authorization by the consumer for preauthorized transfers from the consumer's account. This authorization must be made in writing or similarly authenticated by the consumer, such as by the E-SIGN Act. A copy of the authorization also must be provided to the consumer. In embodiments, initiation of a payment transaction via a text message, as described throughout this disclosure, may be required to be authorized each time by the consumer, and in such cases it would not be considered a "preauthorized" transfer or recurring payment. In such cases, the section of Regulation E relating to pre-authorized disclosures would not be applicable, as the transactions involved do not presumably constitute pre-authorized transfers under Regulation E. In alternative embodiments, where it is desired to set up recurring payments, the methods and systems disclosed herein may be used to facilitate the pre-authorization disclosures, including facilitating authentication of the consumer.

In situations not involving pre-authorization, the Regulation E Initial Disclosures may be provided to the consumer using the messaging facilities described throughout this disclosure. These disclosures may be provided through a website or portal of the platform (such as when the consumer initiates interaction with the platform), by telephone, or by the messaging functions of the platform.

In embodiments, the platform may retain documentation relating to compliance with Regulation E Initial Disclosures for a defined period required by regulation, such as a period of not less than two years from the date the disclosures are required to be made or action is required to be taken, whichever is later. This may include retaining data structures evidencing text threads in which the consumer was provided with the appropriate disclosures for each transaction. Similarly, any oral recordings of the initial consumer authorization/disclosures may be retained for appropriate periods, such as two years following the later of entry or termination of the authorization. To the extent possible, any documentation pertaining to the authorizations made by the consumer may be retained as well.

In some cases, additional disclosures may be required to comply with debt collection laws, such as disclosures required to initiating payments of consumer debt obligations. Such disclosures may be provided as content of text messages from the platform associated with payment of a bill (including noting where the bill is being paid in connection with debt collection actions), and the disclosures, and consumer replies, can be retained as evidence of compliance with such debt collection disclosure obligations. Similarly, the system may prompt reply messages that evidence any required consents needed to comply with debt collection laws and regulations.

While described in connection with Regulation E compliance in connection with authorization of electronic payments from checking accounts, such as in the context of debt collection, it should be understood that the methods and systems described herein can be used to facilitate any disclosures required by other regulations, such as those of other countries relating to authorization of electronic payments, and those of the US and other countries with respect to other actions that require disclosures to be made prior to initiation of actions relating to payments or other aspects of transactions (including shipping, delivery, and the like). For example, disclosures relating to shipping of hazardous items could be facilitated through similar methods and systems to those described herein in connection with the initial disclosures required by Regulation E.

Figure 5A:
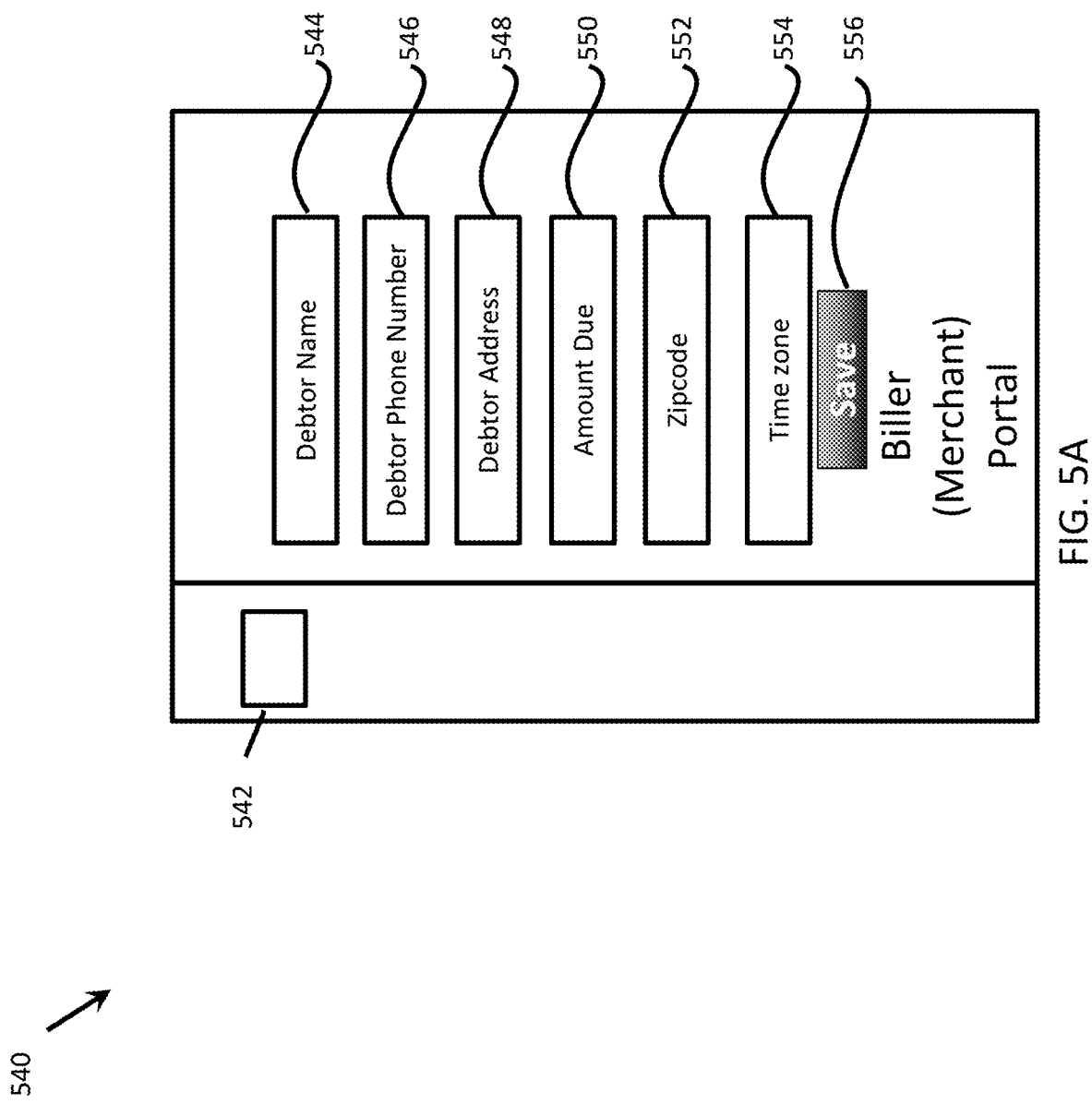
FIG. 5A illustrates a biller portal for a bill payment process and system in accordance with an embodiment of the systems and methods disclosed herein.

FIG. 5A illustrates the biller portal 108 of FIG. 1 in accordance with an exemplary embodiment.

In an example, the biller may log in to the biller portal 108 and access the biller portal 108 that may present a navigation button 542 to the biller to navigate to a page 540 wherein the biller may be able to enter the debtor information. When the biller clicks on the navigation button 542, a screen as illustrated in FIG. 5A may be presented. The screen may display multiple fields of input 544-556, such as in the form of an input form, to the biller to enter the debtor information. The field 544 may allow the biller to enter the debtor's name. The field 546 may allow the biller to enter the debtor phone number. In an example, the phone number may be a phone number provided by the debtor at the time of registration to the bill payment platform 100. In such a scenario, the phone number may be pre-populated in the form based on the information about the debtor already stored in the payment platform 100. In an example, the phone number may be used to obtain authorization from the consumer for bill payment processing transactions in accordance with Reg. E guidelines, as discussed above. The field 548 may allow the biller to enter debtor address. The field 550 may allow the debtor to enter an amount of payment due to be collected from the debtor. In an example, the amount may correspond to the total amount of pending bills payments that may be due for the debtor.

The field 552 may be used for entering debtor zip code and the field 554 may be used for entering debtor time zone, as an example. In an example, the time zone may be pre-populated based on zip code entered earlier by the biller. Once the biller has entered all the information related to the debtor, he may click a button 556, to save the entered information into the storage component 122 of the bill payment platform 100. In an example, the button 556 may contain a label titled "Save" to allow the biller to save the debtor information. In an example, one of the fields may be a consumer phone number field, wherein the biller may enter phone number of the consumer.

In embodiments, the methods and systems described herein may enable the use of keywords contained in SMS messages to direct a flow of communication and processing to enable interactions between a consumer and a biller relating to presentation and payment of one or more bills. One challenge with use of SMS as a communications method is that, unlike email, it is not straightforward to associate a message from a consumer with a particular text that was sent to the consumer. For example, if two messages are sent from the platform described herein to a consumer, each instructing the recipient to "Reply with your PIN," then when the consumer replies there is ambiguity as to whether the reply is intended to apply to the first message or the second message. Thus, a significant challenge with SMS is that there is only one thread of conversation. In contrast, if there is an email communication, one can have numerous threads, such as one for each bill, while there is only one thread that is managed by an SMS system. As a result one may not know if a certain response from a user is to the last thing that was sent or to a previous thing sent in the same thread to the same user. In the case of payments, it is very important to be sure to take the correct action while still maintaining the convenience of the short message format of SMS. In embodiments, the thread of communication with a user can be manage to effectively create a pagination of messages, where if a user sends in a keyword, the system assumes the user is likely reacting to what was sent most recently and prompts a user to reply to a message that confirms that assumption and initiates one of the most logical ensuing actions via one or more keywords. If a user has recently received multiple things, the system can automatically ask which of those things the user is referring to, starting from the most recent message and giving the ability to respond to that, such as by saying "PAID" (indicating the user already paid this), "YES" (or entering a PIN, indicating the user wants to pay that bill), or "NEXT" (indicating the user wants to see the next bill). In embodiments, additional keywords help the user navigate through some of the controls over text, such as "BILLS" or the like. In embodiments, a biller can configure one or more keywords to trigger actions in the platform as the keywords are received by an SMS parser of the platform. In embodiments, a broader application of these concepts can be enabled for various SMS controls, to allow the user to be prompted for responses that trigger various ensuing flows. Among other things, such controls can create a pagination or navigation interface using SMS keywords, where the keywords, among other benefits, help confirm which messages within a thread are the subject of a response message and allow a user to indicate actions to be undertaken with respect to such messages.

Accordingly, a need exists for methods and systems to disambiguate among various messages that are contained in a single thread of SMS communication between a consumer and a biller. Provided herein are methods and systems for solving this problem with the single-thread character of SMS conversations. These methods and systems provide additional controls that enable other control functions via SMS.

Figure 6:
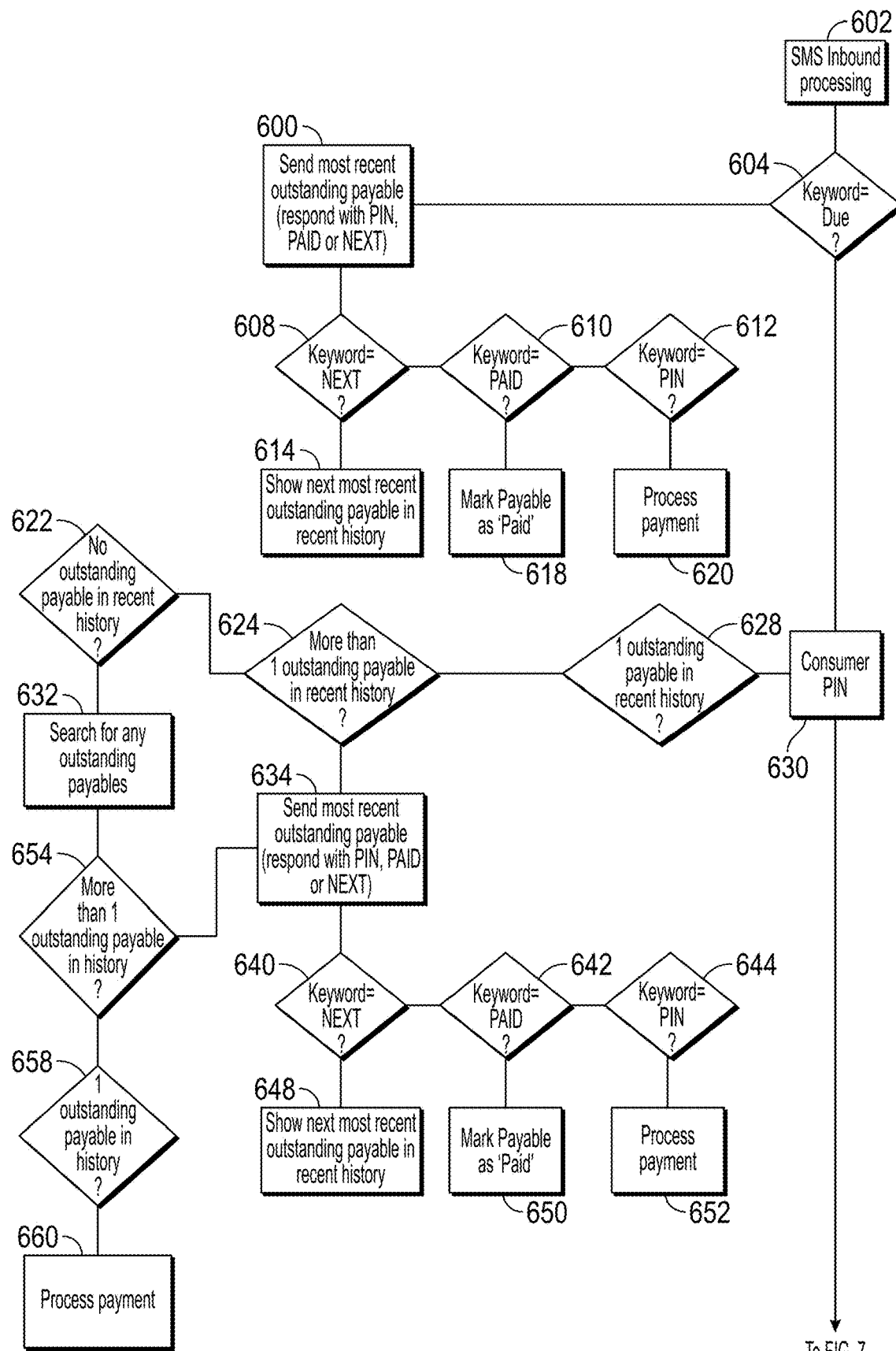
FIGS. 6 and 7 illustrate an intelligent response system for a bill payment process and system in accordance with an embodiment of the systems and methods disclosed herein.
Figure 7:
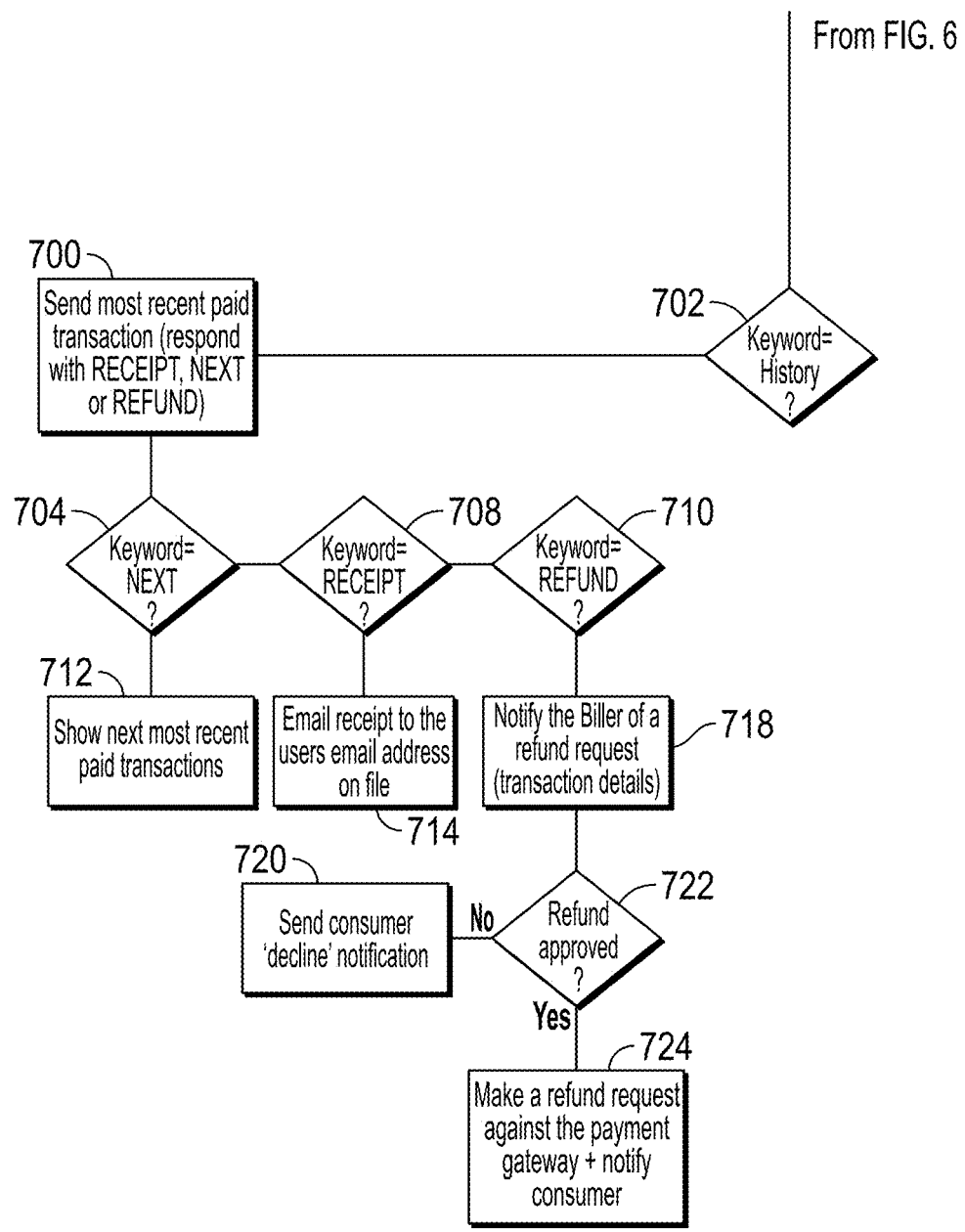

Referring to FIGS. 6 and 7, in embodiments of the present disclosure, an intelligent response system is provided, enabled by a set of computer-based processing modules that automatically, under computer control, process one or more keywords sent by a user, the transaction history of a user and historical consumer behavior to enable and manage a flow of processing actions based on those keywords and other inputs. An SMS inbounding processing facility 602 parses each text received from consumers and determines whether the text message contains a match to a keyword used for processing, such as used in response to an appropriate prompt from the platform. A library of such keywords can be supported to enable various processing flows. These keywords can be prompted and processed in a defined flow, such as the exemplary flow of FIG. 6 and FIG. 7. For example, at a step 604 a keyword such as "due," (or another similar keyword such as "list," "outstanding," or the like) can be used to trigger a step 600 of sending the consumer the most recent outstanding bills that are being managed for that consumer in the platform, with a request for the consumer to respond with keywords such as "next," "paid," or the consumer's PIN. If the keyword "next" is received at a step 608, then at a step 614 the consumer is shown the next most recent outstanding bill payable in the recent history. If the keyword "paid" or the like is received at a step 610, the system marks that bill as paid in the system in a step 618. If the consumer's PIN is received at a step 612, then at a step 620 the system can process a payment of the bill for the consumer.

In embodiments, if the consumer sends a PIN code or other trigger word indicating at a step 630 the desire to pay bills, a flow may commence where the system checks if a user has received a bill notification from the system in a recent history (which may be a configurable period per biller, a configurable number of bills, or the like). If at a step 628 it is determined that there is only one notification sent in the applicable period, then the system may treat the PIN as payment authorization for that bill reminder and may process payment at a step 638. If at a step 624 it is determined that there is more than one notification sent in the period then at a step 634 the platform may send a message that includes the payment details, starting with the most recent notification sent, and at a step 634 may prompt the user to reply back with the user's PIN (or the keyword YES) if they want to pay that bill, the keyword "NEXT" if the user wants to see the second most recent notification sent in the period, or the keyword "PAID" if that bill has already been paid. If at a step 640 the system receives the keyword "NEXT," then at a step 648 the system can show the next most recent outstanding payable in recent history, a flow that can repeat (not shown on FIG. 6) with repeated entry of the keyword "NEXT," so that the user can scroll through a series of bills until a desired one is found. If at a step 642 the keyword "PAID" is received, the system can mark the payable as paid at a step 650, such that the bill will not be further presented to the user by the system. If at a step 644 the user's PIN or the keyword "YES" is received, then at a step 652 the system can process payment of the bill that was presented in the particular message. If up receiving the PIN at the step 630 it is determined in a step 622 that there are no reminders sent in 'recent history,' then the system can, in a step 632 search for any outstanding payables, including for prior periods, and if at a step 654 it is determined that there is more than one outstanding payable in the history processing can commence at the step 634 to prompt the user to reply as noted above with "NEXT," "PAID," or the user's PIN (or "YES") to work through a series of bills as noted above. If at a step 658 it is determined that the search of the step 632 returned a single outstanding payable in the older history, then the system can process payment at a step 660 for that payable.

Another challenge in payment systems is the handling of refunds. In most transaction handling systems, refund request processing is typically a laborious process for the consumer and biller. In embodiments, as an extension of the "History" keyword above or similar keywords (where users can see the last few payments that have been made), the platform can enable a user to reply back to message that describes the details of a specific prior payment with a reply message that includes the keyword "Refund." The keyword refund can initiate a process that provides the biller's representative, such as with a simple web interface, email and text notification with the details of the payment that the consumer is requesting to have refunded. In the interface, the biller can then approve or decline the refund request. If approved, the system makes a request from the payment gateway that the payment was made through to refund the payment. If declined, the system sends an SMS message to the consumer letting the consumer know that the refund request was declined. This message can be made configurable in the platform, so that billers can include relevant follow up information, such as the details of additional steps the consumer may need to undertake to pursue the refund, details as to refund policies, or the like.

It may be noted that the challenge with handling refunds is somewhat different than the challenge with handling payments. If a consumer is asking for a refund, the system needs to disambiguate as above (determining which bill is the one for which a refund is sought), but there is an added step, which is that the biller needs to approve the refund. As with payments, this can be enabled as a keyword-driven action (having the platform recognize the keyword "REFUND" as a trigger to a processing flow). The platform can start with the most recent payment, and the user can reply "YES" to request a refund for a particular payment or "NEXT" to see more paid bills. If the user indicates the keyword "YES," indicating a desire for a refund to the bill represented by the most recent message, the system can highlight that to the biller, and once the biller approves the refund, the system can make a refund happen. In conventional systems, handling of refunds is a very laborious and very costly process for most billers. Accordingly, a need exists for simplified systems.

Referring to FIG. 7, a flow for a refund process (which is a continuation of the flow of FIG. 6) is provided. If the SMS processing facility determines at the step 602 of FIG. 6 that a user has sent the keyword "HISTORY," or the like, then the system can, at a step 700, send the most recent paid transaction along with a prompt for a reply with a keyword "RECEIPT," "NEXT," or "REFUND" to indicate the user's intended action with respect to past paid transactions. If at a step 704 the keyword NEXT is received from the user in response to the prompt of the step 700, then at a step 712 the system will send a message with the next most recent paid transaction, a process that can be repeated to allow the user to scroll through to additional past transactions (not shown in FIG. 7) by repeated entry of the keyword "NEXT." If at a step 708 the keyword RECEIPT is received from the user in response to the prompt of the step 700, then at a step 714 the system will email a receipt to the user, such as to the user's email address that is on file from the registration of the user with the platform. If at a step 710 the keyword REFUND is received from the user in response to the prompt of the step 700, then at a step 718 the system will notify the biller of the payment in question of a refund request with transaction details. At a step 722 the system can determine whether a refund is approved. If not, then at a step 720 the system can send the consumer a notification that the refund was declined. If at the step 722 the refund is approved by the biller, then at a step 724 the system can initiate the refund request to the payment gateway and notify the consumer that the refund has been approved.

In alternative embodiments, a message sent by the system can comprise a menu, such as allowing a user to select by a number or letter a particular response among a set of responses (such as "Pay," "Next," "Mark Paid," or the like). While a menu may have certain advantages, it may require more messaging back and forth between the platform and the user, possibly diminishing some of the benefits of the short, convenient format of SMS as a payment enabling communications platform.

Figure 8:
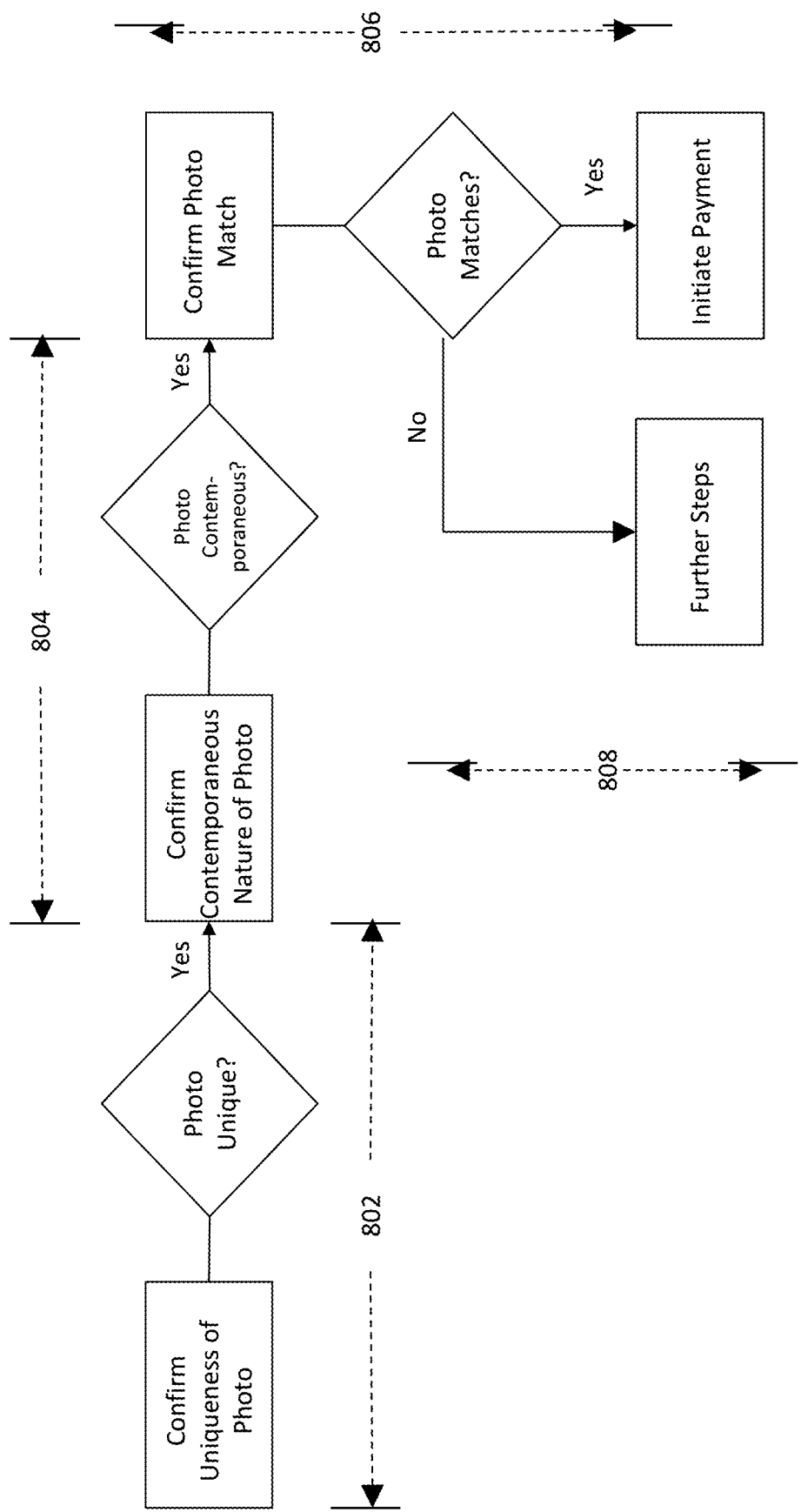
FIG. 8 illustrates a user authentication process for a bill payment process and system in accordance with an embodiment of the systems and methods disclosed herein.

One challenge with SMS as a payment platform is the challenge of authentication of a user. SMS authentication is challenging among other reasons because SMS messages remain visible on the user's device unless the user explicitly deletes them. This means that an unauthorized user could initiate a payment by taking possession of the user's device. In embodiments, to ensure authentication, the user may be prompted to send a reply message that includes a picture of the face of the user. In such embodiments, the system can process the picture to aid authentication, as illustrated in FIG. 8. This can include making one or more determinations with respect to the picture, such as that the picture is unique as shown in step 802 (i.e., it is not the same as previous a previous photograph received by the system), that the picture is contemporaneous with the reply message (such as by extracting a time stamp from the photo and comparing it to the timestamp of the message) as shown in step 804, and that the picture is of the user that is allowed to authorize the payment (such as by comparing the photograph to one or more other photographs of the user maintained by the system, starting with a photograph captured of the user upon registration with the platform) as shown in step 806.

Recognition of the user in a photograph can be accomplished by facial recognition software of various types known to those of skill in the art, such as based on calculating the relative locations of various facial features and calculating their similarity to the same features in another photograph, with a degree of certainty/uncertainty as to whether there is a match.

In embodiments, the request for a photograph of the user can be a configurable item in the platform for a biller. For example, a biller might require photographic authentication based on the size of the bill (or a collection of bills) that are being paid, based on indications that the user may be not be the authentic user (such as unusual transactions), or the like. A biller or the host of the platform can configure other parameters, such as the proximity in time required between the taking of the photograph and the reply message in order to deem it contemporaneous, the degree of certainty required to determine a match, and the like.

Upon determination of a match, processing can continue, such as to trigger completion of a payment of a bill, as shown in step 808. Upon determination that a match is not confirmed, processing can continue to further steps, as shown in step 808, including requesting another photograph, requesting another mechanism of authentication, and/or triggering an alert of suspicious usage of the user's device, and the like.

Figure 9:
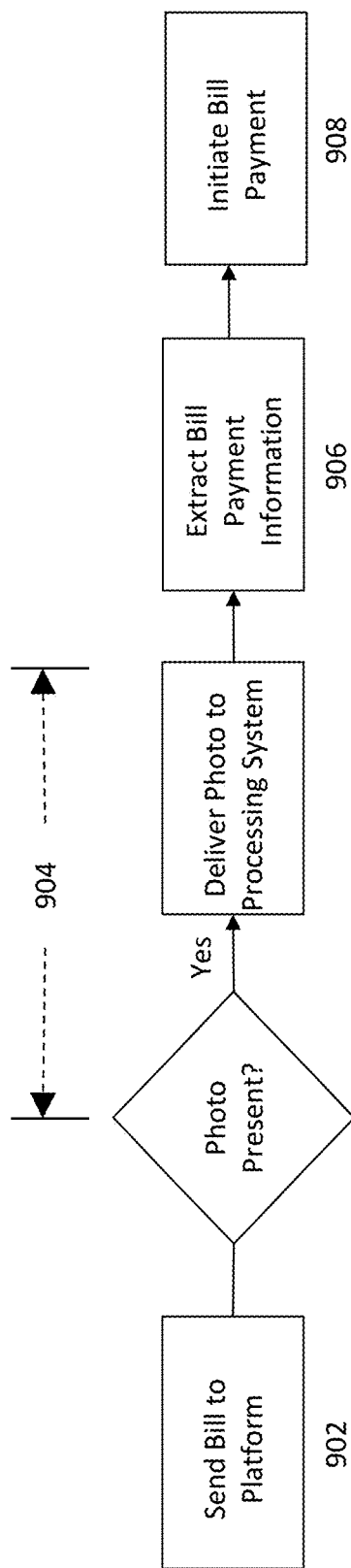
FIG. 9 illustrates a simplified bill payment process for a bill payment process and system in accordance with an embodiment of the systems and methods disclosed herein.

In many cases, consumers still receive paper bills, but would like to simplify the process of paying them. A persistent problem is that a consumer's entering of information that is printed on a paper bill can be confusing, time consuming and prone to error. The methods and systems described herein can be used to facilitate a simplified process for handling such bills, as illustrated in FIG. 9. In embodiments, a user may be prompted to take a picture of a bill, such as using the camera of the user's mobile phone, and send the bill to the platform via a message, as shown in step 902, such as an MMS message, such as with a keyword, such as "PAY". In response to receiving the keyword and determining the presence of a photo, the system can deliver the photograph to a processing system, as shown in step 904, such as an OCR (Optical Character Recognition) system, which may extract the information needed to pay the bill (such as the amount, a bill identifier, the due date, and the consumer's identifying information (such as name and address), as shown in step 906. The extracted information can be used to initiate payment of the bill, as shown in step 908. In embodiments, the information may be compared to bills that have been ingested in the system from a biller, such as to confirm the accuracy of the OCR information, to correct the information, and/or to obtain additional information about the bill prior to initiating payment. In embodiments, the user can then receive a text asking the user to confirm the payment (and the details as determined by the system, such as the payment amount and timing), in accordance with the other embodiments described throughout this disclosure.

In certain embodiments of the present disclosure, a user may be provided with a unique PIN for authentication, which may be configurable by the user (such as to provide a different PIN for the user with respect to each biller).

Having provided an overall context for message-based bill payment and the like, the description now turns to a brief discussion of an example of a computer system that may be used for any of the entities, facilities, portals, components, and the like described herein.

Figure 10:
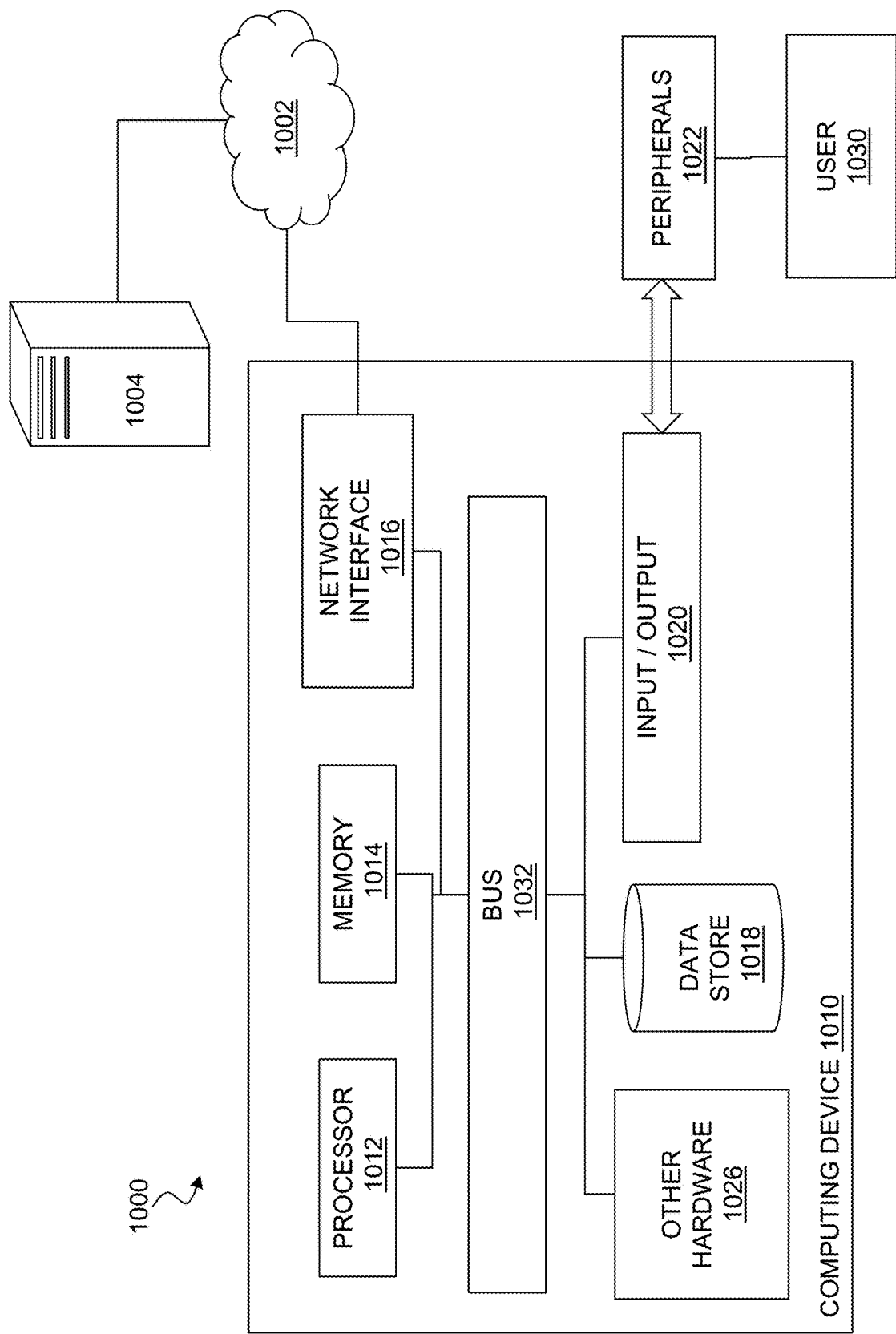
FIG. 10 illustrates a computer system.

FIG. 10 illustrates a computer system. In general, the computer system 1000 may include a computing device 1010 connected to a network 1002, e.g., through an external device 1004. The computing device 1010 may be or include any type of client, computing device, or other network endpoint as described herein. For example, the computing device 1010 may include a desktop computer workstation. The computing device 1010 may also or instead be any device suitable for interacting with other devices over a network 1002, such as a laptop computer, a desktop computer, a personal digital assistant, a tablet, a mobile phone, a television, a set top box, a wearable computer, and the like. The computing device 1010 may also or instead include a server such as any of the servers described herein.

The computing device 1010 may be used for any of the entities described in the bill payment environment/system described herein. For example, the computing device 1010 may be part of or may include a billing management facility or any of the other facilities or computing devices described therein. In certain aspects, the computing device 1010 may be implemented using hardware (e.g., in a desktop computer), software (e.g., in a virtual machine or the like) or a combination of software and hardware. The computing device 1010 may be a standalone device, a device integrated into another entity or device, a platform distributed across multiple entities, or a virtualized device executing in a virtualization environment.

The network 1002 may include any network described above, e.g., data network(s) or internetwork(s) suitable for communicating data and control information among participants in the computer system 1000. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 1000. The network 1002 may also include a combination of data networks, and need not be limited to a strictly public or private network.

The external device 1004 may be any computer or other remote resource that connects to the computing device 1010 through the network 1002. This may include bill management resources such as any of those contemplated above, gateways or other network devices, remote servers or the like containing content requested by the computing device 1010, a network storage device or resource, a device hosting a customer or biller, or any other resource or device that might connect to the computing device 1010 through the network 1002.

In general, the computing device 1010 may include a processor 1012, a memory 1014, a network interface 1016, a data store 1018, and one or more input/output interfaces 1020. The computing device 1010 may further include or be in communication with peripherals 1022 and other external input/output devices that might connect to the input/output interfaces 1020.

The processor 1012 may be any processor or other processing circuitry capable of processing instructions for execution within the computing device 1010 or computer system 1000. The processor 1012 may include a single-threaded processor, a multi-threaded processor, a multi-core processor and so forth. The processor 1012 may be capable of processing instructions stored in the memory 1014 or the data store 1018.

The memory 1014 may store information within the computing device 1010. The memory 1014 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 1014 may store program instructions, program data, executables, and other software and data useful for controlling operation of the computing device 1010 and configuring the computing device 1010 to perform functions for a user. The memory 1014 may include a number of different stages and types of memory for different aspects of operation of the computing device 1010. For example, a processor may include on-board memory and/or cache for faster access to certain data or instructions, and a separate, main memory or the like may be included to expand memory capacity as desired. All such memory types may be a part of the memory 1014 as contemplated herein.

The memory 1014 may, in general, include a non-volatile computer readable medium containing computer code that, when executed by the computing device 1010 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 1014 is depicted, it will be understood that any number of memories may be usefully incorporated into the computing device 1010. For example, a first memory may provide non-volatile storage such as a disk drive for permanent or long-term storage of files and code even when the computing device 1010 is powered down. A second memory such as a random access memory may provide volatile (but higher speed) memory for storing instructions and data for executing processes. A third memory may be used to improve performance by providing higher speed memory physically adjacent to the processor 1012 for registers, caching, and so forth.

The network interface 1016 may include any hardware and/or software for connecting the computing device 1010 in a communicating relationship with other resources through the network 1002. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 1010 and other devices. The network interface 1016 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 1016 may include any combination of hardware and software suitable for coupling the components of the computing device 1010 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 1002 such as the Internet. This may also or instead include hardware/software for a WiMax connection or a cellular network connection (using, e.g., CDMA, GSM, LTE, or any other suitable protocol or combination of protocols). The network interface 1016 may be included as part of the input/output devices 1020 or vice-versa.

The data store 1018 may be any internal memory store providing a computer-readable medium such as a disk drive, an optical drive, a magnetic drive, a flash drive, or other device capable of providing mass storage for the computing device 1010. The data store 1018 may store computer readable instructions, data structures, program modules, and other data for the computing device 1010 or computer system 1000 in a non-volatile form for subsequent retrieval and use. For example, the data store 1018 may store without limitation one or more of the operating system, application programs, program data, databases, files, and other program modules or other software objects, and the like.

The input/output interface 1020 may support input from and output to other devices that might couple to the computing device 1010. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 1016 for network communications is described separately from the input/output interface 1020 for local device communications, these two interfaces may be the same, or may share functionality, such as where a USB port is used to attach to a WiFi accessory, or where an Ethernet connection is used to couple to a local network attached storage.

A peripheral 1022 may include any device used to provide information to or receive information from the computing device 1000. This may include human input/output (I/O) devices such as a keyboard, a mouse, a mouse pad, a track ball, a joystick, a microphone, a foot pedal, a camera, a touch screen, a scanner, or other device that might be employed by the user 1030 to provide input to the computing device 1010. This may also or instead include a display, a speaker, a printer, a projector, a headset or any other audiovisual device for presenting information to a user. The peripheral 1022 may also or instead include a digital signal processing device, an actuator, or other device to support control or communication to other devices or components. Other I/O devices suitable for use as a peripheral 1022 include haptic devices, three-dimensional rendering systems, augmented-reality displays, magnetic card readers, and so forth. In one aspect, the peripheral 1022 may serve as the network interface 1016, such as with a USB device configured to provide communications via short range (e.g., BlueTooth, WiFi, Infrared, RF, or the like) or long range (e.g., cellular data or WiMax) communications protocols. In another aspect, the peripheral 1022 may provide a device to augment operation of the computing device 1010, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 1000 may be used as a peripheral 1022 as contemplated herein.

Other hardware 1026 may be incorporated into the computing device 1000 such as a co-processor, a digital signal processing system, a math co-processor, a graphics engine, a video driver, and so forth. The other hardware 1026 may also or instead include expanded input/output ports, extra memory, additional drives (e.g., a DVD drive or other accessory), and so forth.

A bus 1032 or combination of busses may serve as an electromechanical platform for interconnecting components of the computing device 1000 such as the processor 1012, memory 1014, network interface 1016, other hardware 1026, data store 1018, and input/output interface. As shown in the figure, each of the components of the computing device 1010 may be interconnected using a system bus 1032 or other communication mechanism for communicating information.

Methods and systems described herein may be realized using the processor 1012 of the computer system 1000 to execute one or more sequences of instructions contained in the memory 1014 to perform predetermined tasks. In embodiments, the computing device 1000 may be deployed as a number of parallel processors synchronized to execute code together for improved performance, or the computing device 1000 may be realized in a virtualized environment where software on a hypervisor or other virtualization management facility emulates components of the computing device 1000 as appropriate to reproduce some or all of the functions of a hardware instantiation of the computing device 1000.

Figure 11:
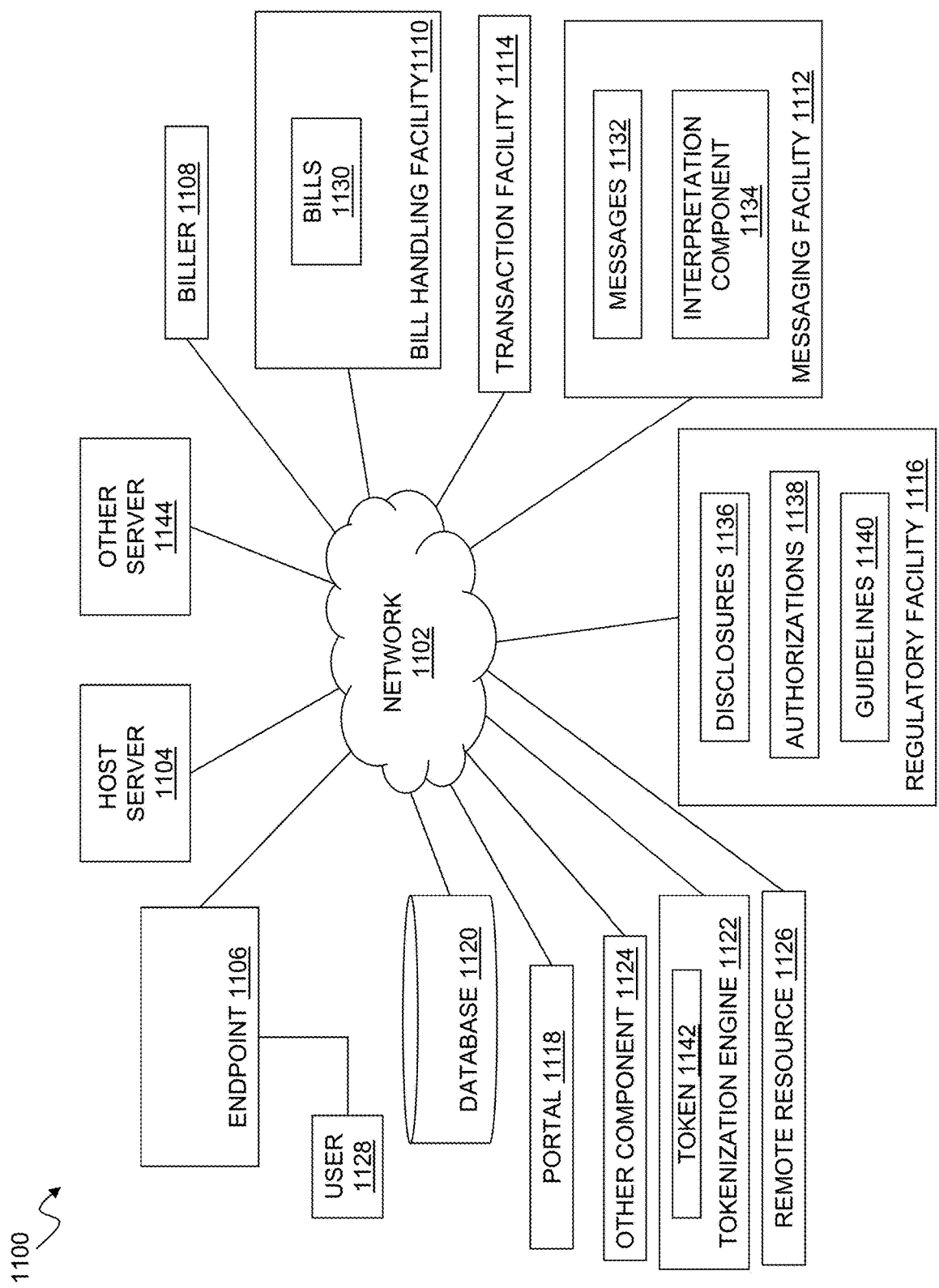
FIG. 11 illustrates a system for bill payment.

FIG. 11 illustrates a system for bill payment. As shown in the figure, the system 100 may include a network 1102 interconnecting a plurality of participants (e.g., devices, systems, components, resources, facilities, portals, and so on) in a communicating relationship. The participants may, for example, include a host server 1104, a client 1106, a biller 1108, a bill handling facility 1110, a messaging facility 1112, a transaction facility 1114, a regulatory facility 1116, a portal 1118, a database 1120, a tokenization engine 1122, one or more other components 1124, and a remote resource 1126.

The network 1102 may include any data network(s) or internetwork(s) suitable for communicating data and control information among participants in the system 1100. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the system 1100. The network 1102 may also include a combination of data networks, and need not be limited to a strictly public or private network. The participants in the system 1100 may each include network interfaces or the like for communication over the network 1102. The data network 1102 and the network interfaces of the participants may allow for real time data synchronization, communications, bill processing and management, and the like.

The host server 1104 may host components of the system 1100 or other resources such as the client 1106, the biller 1108, the bill handling facility 1110, the messaging facility 1112, the transaction facility 1114, or any other facility, component, service, resource, or the like as contemplated herein.

The clients 1106 may include consumer devices, biller devices, network devices, and so forth, such as a computer or computer system, a laptop, a Personal Digital Assistant (PDA), a mobile phone, a smart phone, a tablet, or any other mobile or fixed computing device. In embodiments, the term "client" may refer to a computer system that may source data, receive data, evaluate data, buffer data, or the like, such as a user's desktop computer as a client computer. In embodiments, the client 1106 may refer to a source or destination for data, including such components where the destination is characterized by an evaluation point for data, and where the data may be sent to a subsequent destination after evaluation. The client 1106 may include an application loaded onto the computer platform or computer support component, or an application program interface (API), where the application may accommodate the plurality of computer platforms and/or functional requirements of the participants of the system 1100. In an aspect, the client 1106 includes an API connection to a database 1120, a biller 1108, a bill handling facility 1110, a messaging facility 1112, a remote resource 1126, or the like. The system 1100 may also or instead include API connections between other participants. The API connections may enable real time features such as notifications, payments, billings, messages, and so forth.

In an aspect, the client 1106 may include an onsite computer or computer system operated by a user 1128 (e.g., a customer or consumer of a merchant, e.g., a biller 1108). However, other network elements such as the remote resource 1126, the host server 1104, the bill handling facility 1110, the messaging facility 1112, or other participants may be clients in certain contexts, such as where a server hosts one or more virtual machines or the bill handling facility 1110 includes its own computer or computer system for performing functions of the client 1106. In general, the client 1106 may store, monitor, analyze, and send/receive data between the client 1106 and other resources connected to the network 1102.

The client 1106 may include a user interface for use by the user 1128, e.g., a user interface hosted by a remote resource 1126 (or another participant in the system 1100) and remotely accessible through the data network 1102.

The biller 1108 may include any as described herein, e.g., a merchant or the like that issues a bill 1130 to a user 1128 or other consumer.

The bill handling facility 1110 may handle or manage a plurality of bills 1130 for a plurality of billers 1108 (e.g., merchants).

The messaging facility 1112 may include a short messaging communications component for presenting at least one bill 1130 of a merchant (e.g., the biller 1108) to a consumer (e.g., the user 1128) via a short message format or the like. The messaging facility 1112 may also or instead be configured for receiving one or more messages 1132 from a consumer relating to a bill 1130.

The messaging facility 1112 may include a message interpretation component 1134 for automatically disambiguating a message 1132 received from the consumer at the messaging facility 1112 (e.g., short message communications component) and initiating a bill-related processing action based on the interpretation.

The transaction facility 1114 may include a secure transaction component for automatically authenticating a consumer prior to initiating a bill payment and initiating a payment from the consumer to the merchant upon the authentication.

The regulatory facility 1116 may include a regulatory compliance component that is configured to automatically provide a plurality of disclosures 1136 to the consumer in connection with a bill collection process and is configured to automatically prompt a plurality of authorizations 1138 from the consumer prior to initiating the taking of a bill payment from the consumer. The plurality of disclosures 1136 and the plurality of authorizations 1138 may be configured to satisfy certain guidelines 1140, e.g., regulatory guidelines.

The portal 1118 may include one or more of the various portals as described herein including without limitation a white label consumer facing portal, a biller portal, a consumer portal, and the like.

The database 1120 may include a storage component configured to store data associated with a plurality of components of the system 1100, e.g., a bill payment platform. For example, the database 1120 may store one or more of information regarding a user 1128 or a biller 1108, bills 1130, messages 1132, rules or regulations (e.g., the guidelines 1140), disclosures 1136, authorizations 1138, tokens, and the like.

The tokenization engine 1122 may be configured to generate a token 1142 and send an output to a component of the system 1100 that executes preprogrammed instructions to perform a plurality of payment processing operations based on available information.

The other component 1124 may include any of the other portals, components, facilities, or the like described herein. By way of example, the other component 1124 may include a processing component, a mapping component, a storage component, a secure transaction component, a regulatory compliance component, or the like.

The remote resource 1126 may include any resource that is suitable for communication, access, or otherwise in the system 1100. The remote resource 1126 may also or instead include a web server, processing resource, program, computer file, database, file server, e-mail server, media server, or other server, or any other computing resource or the like accessible through the network 1102, as well as combinations of the foregoing.

In addition to the host server 1104, the system 1100 may also or instead include one or more other servers 1144 for performing any of the functionality as described herein.

One skilled in the art will recognize that a specific participant in the system 1100 may also or instead include the components or features described herein as a part of another participant in the system 1100, and a specific participant in the system 1100 may also or instead perform the functions described herein for another participant in the system 1100. By way of non-limiting example, although the bill handling facility 1110 may be described above as the component that manages the bills 1130, a bill 1130 may also or instead be managed by another participant.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

What is claimed is:

1. A computing platform for message-based financial transactions, the computing platform comprising:
   a memory including a non-volatile computer readable medium;
   one or more processors; and
   non-transitory computer executable code embodied in the non-volatile computer readable medium of the memory, the code executable by the one or more processors to:
- receive consumer-specific information related to a financial transaction between a consumer and a merchant;
- present the financial transaction to the consumer over a data network via a short message format for receipt at a computing device of the consumer;
- receive a message related to the financial transaction over the data network via the short message format from the computing device of the consumer, the message included within a single thread that includes a plurality of messages related to a plurality of financial transactions for the consumer;
- automatically disambiguate the message related to the financial transaction from the plurality of messages related to the plurality of financial transactions to identify at least the merchant and the financial transaction based on one or more of: (i) one or more keywords included in the message, (ii) a messaging history for the consumer, (iii) historical behavior of the consumer, and (iv) outstanding financial transactions for the consumer;
- automatically authenticate the consumer using a secure transaction component of a transaction facility prior to initiating a processing action for the financial transaction; and
- upon completion of the authentication, initiate the processing action for the financial transaction based on an interpretation of the message as disambiguated.

2. The computing platform of claim 1, wherein the short message format is short messaging service (SMS).

3. The computing platform of claim 1, wherein the message related to the financial transaction includes a bill for the consumer from the merchant.

4. The computing platform of claim 3, wherein the processing action includes initiating a payment related to the bill.

5. The computing platform of claim 1, wherein the processing action includes presenting one or more of a link and a URL from which the consumer can complete the financial transaction.

6. The computing platform of claim 1, wherein the processing action includes initiating a payment.

7. The computing platform of claim 6, wherein the processing action includes initiating an electronic fund transfer (EFT).

8. The computing platform of claim 6, wherein the processing action includes charging a credit card of the consumer.

9. The computing platform of claim 1, wherein the code is executable by the one or more processors to complete the financial transaction using a payment token associated with the consumer.

10. The computing platform of claim 9, wherein the code is executable by the one or more processors to generate the payment token.

11. The computing platform of claim 9, wherein the code is executable by the one or more processors to store the payment token to facilitate future financial transactions.

12. The computing platform of claim 11, wherein the payment token is stored with credit card information of the consumer.

13. The computing platform of claim 1, wherein the code is executable by the one or more processors to request an identifier from the consumer to authenticate the consumer.

14. The computing platform of claim 13, wherein the identifier includes a Personal Identification Number (PIN) number.

15. The computing platform of claim 13, wherein the processing action includes requesting the identifier.

16. The computing platform of claim 15, wherein the identifier indicates an intention of the consumer to complete the financial transaction.

17. The computing platform of claim 1, wherein the code is executable by the one or more processors to provide a consumer facing portal for the consumer to complete the financial transaction.

18. A computer program product for message-based bill management, the computer program product comprising computer executable code embodied in a non-transitory computer readable medium that, when executing on one or more computing devices, performs the steps of:
- receiving consumer-specific information related to a financial transaction between a consumer and a merchant;
- presenting the financial transaction to the consumer over a data network via a short message format for receipt at a computing device of the consumer;
- receiving a message related to the financial transaction over the data network via the short message format from the computing device of the consumer, the message included within a single thread that includes a plurality of messages related to a plurality of financial transactions for the consumer;
- automatically disambiguating the message related to the financial transaction from the plurality of messages related to the plurality of financial transactions to identify at least the merchant and the financial transaction based on one or more of: (i) one or more keywords included in the message, (ii) a messaging history for the consumer, (iii) historical behavior of the consumer, and (iv) outstanding financial transactions for the consumer;
- automatically authenticating the consumer using a secure transaction component of a transaction facility prior to initiating a processing action for the financial transaction; and
- upon completion of the authentication, initiating the processing action for the financial transaction based on an interpretation of the message as disambiguated.

19. The computer program product of claim 18, wherein the short message format is short messaging service (SMS).

20. A bill payment computing platform for message-based bill management enabled by a host server module, the bill payment computing platform comprising:
- one or more processors; and
- a non-transitory computer executable code embodied in a computer readable medium executable by the one or more processors, the bill payment computing platform further comprising:
- a bill handling facility configured by the computer executable code to connect to a plurality of merchant portals through a data network, and to handle a plurality of bills of a plurality of merchants received from the plurality of merchant portals for a consumer through the bill handling facility;
- a messaging communications component of a messaging facility configured by the computer executable code to receive a bill of the plurality of bills from a merchant of the plurality of merchants through the bill handling facility and present the bill to the consumer through the data network via a short message format, the messaging communications component further configured by the computer executable code to receive a message through the data network via the short message format from the consumer relating to the bill, wherein the messaging communications component is configured by the computer executable code to manage a plurality of messages related to the plurality of bills to the consumer within a single thread of messages;

a secure transaction component of a transaction facility configured by the computer executable code to automatically authenticate the consumer prior to initiating a bill payment from the consumer and to initiate a payment from the consumer to the merchant upon the completing the authentication and receiving an approval to initiate the bill payment from the consumer through the messaging communications component; and a message interpretation component of the messaging facility configured by the computer executable code to message with the consumer at the message communications component according to one or more keywords and an identification of one of the plurality of merchants by a mapping component, wherein the message interpretation component is further configured by the computer executable code to automatically disambiguate the message by analyzing any of (i) the one or more keywords sent by the consumer, (ii) a message context including a messaging history of the consumer, (iii) historical consumer behavior of the consumer, (iv) a status of the consumer including at least whether the consumer has an outstanding bill for payment, wherein the message interpretation component is further configured by the computer executable code to initiate a bill-related processing action based on the disambiguation, the bill-related processing action including a response to the message.

* * * * *